US012481391B2

(12) United States Patent
Lee et al.

(10) Patent No.: US 12,481,391 B2
(45) Date of Patent: Nov. 25, 2025

(54) SENSOR DEVICE AND DRIVING METHOD THEREOF

(71) Applicant: Samsung Display Co., LTD., Yongin-si (KR)

(72) Inventors: Choon Hyop Lee, Yongin-si (KR); Jang Hui Kim, Yongin-si (KR); In Nam Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/392,847

(22) Filed: Dec. 21, 2023

(65) Prior Publication Data

US 2024/0427454 A1 Dec. 26, 2024

(30) Foreign Application Priority Data

Jun. 22, 2023 (KR) ........................ 10-2023-0080523

(51) Int. Cl.
*G06F 3/041* (2006.01)
*G06F 3/044* (2006.01)

(52) U.S. Cl.
CPC ...... *G06F 3/04166* (2019.05); *G06F 3/04162* (2019.05); *G06F 3/04182* (2019.05); *G06F 3/0446* (2019.05)

(58) Field of Classification Search
CPC ............... G06F 3/04182; G06F 3/0446; G06F 3/04162; G06F 3/04166
USPC .................................................. 345/173–174
See application file for complete search history.

(56) References Cited

U.S. PATENT DOCUMENTS

| | | | | |
|---|---|---|---|---|
| 10,877,617 | B2 * | 12/2020 | Park | G06F 3/0443 |
| 11,036,331 | B2 | 6/2021 | Kim | |
| 11,257,452 | B2 | 2/2022 | Kim | |
| 11,502,141 | B2 | 11/2022 | Lee | |
| 11,675,459 | B1 * | 6/2023 | Kang | G06F 3/04184 345/174 |
| 2016/0018921 | A1 * | 1/2016 | Matlick | G06F 3/04162 345/174 |
| 2016/0195990 | A1 | 7/2016 | Han | |
| 2018/0217686 | A1 * | 8/2018 | Qiao | G06F 3/0442 |
| 2020/0201505 | A1 * | 6/2020 | Jung | G06F 3/0383 |

(Continued)

FOREIGN PATENT DOCUMENTS

| | | | |
|---|---|---|---|
| KR | 10-2016-0085126 | A | 7/2016 |
| KR | 10-2553409 | B1 | 7/2023 |
| KR | 10-2555832 | B1 | 7/2023 |

*Primary Examiner* — Kwin Xie
(74) *Attorney, Agent, or Firm* — Womble Bond Dickinson (US) LLP

(57) ABSTRACT

A sensor device includes: first sensors connected to first sensor lines; second sensors connected to second sensor lines, the second sensors intersecting the first sensors; a sensor transmitter connected to the first sensors through the first sensor lines, the sensor transmitter configured to supply touch driving signals to the first sensors during a touch sensing period; and a sensor receiver connected to the second sensors through the second sensor lines, the sensor receiver configured to receive touch sensing signals from the second sensors during the touch sensing period, wherein the sensor receiver includes a plurality of analog front-ends, and wherein each of the plurality of analog front-ends is connected to at least one of the second sensor lines and at least one of the first sensor lines.

14 Claims, 19 Drawing Sheets

(56) References Cited

U.S. PATENT DOCUMENTS

| | | | | |
|---|---|---|---|---|
| 2021/0055829 | A1* | 2/2021 | Miyamoto ........ | H04W 72/0446 |
| 2021/0313401 | A1* | 10/2021 | Lee ..................... | G06F 3/04164 |

* cited by examiner

SENSOR DEVICE AND DRIVING METHOD THEREOF

CROSS-REFERENCE TO RELATED APPLICATION

The present application claims priority to and the benefit of Korean patent application No. 10-2023-0080523, filed on Jun. 22, 2023, in the Korean Intellectual Property Office, the entire disclosure of which is incorporated herein by reference.

BACKGROUND

1. Field

Aspects of some embodiments of the present disclosure generally relate to a sensor device and a driving method thereof.

2. Description of the Related Art

With the development of information technologies, the importance of a display device which provides a connection medium between users and information has increased over time. Accordingly, display devices such as a liquid crystal display devices and organic light emitting display devices are increasingly used.

A display device may include a display unit for displaying images and a sensor unit for sensing user input. The sensor unit may be located while overlapping with a pixel unit. The user input may be made through not only a touch but also an electronic device such as an active pen.

The above information disclosed in this Background section is only for enhancement of understanding of the background and therefore the information discussed in this Background section does not necessarily constitute prior art.

SUMMARY

Aspects of some embodiments include a sensor device and a driving method thereof, which can perform touch sensing and active pen sensing, using a minimum configuration.

According to some embodiments of the present disclosure, a sensor device includes: first sensors connected to first sensor lines; second sensors connected to second sensor lines, the second sensors intersecting the first sensors; a sensor transmitter connected to the first sensors through the first sensor lines, the sensor transmitter supplying touch driving signals to the first sensors during a touch sensing period; and a sensor receiver connected to the second sensors through the second sensor lines, the sensor receiver receiving touch sensing signals from the second sensors during the touch sensing period, wherein the sensor receiver includes a plurality of analog front-ends, and wherein each of the plurality of analog front-ends is connected to at least one of the second sensor lines and at least one of the first sensor lines.

According to some embodiments, each of the plurality of analog front-ends may be connected to three of the second sensor lines and two of the first sensor lines.

According to some embodiments, the plurality of analog front-ends may include a first analog front-end and a second analog front-end. According to some embodiments, one of the second sensor lines connected to the first analog front-end may be connected to the second analog front end.

According to some embodiments, one of the first sensor lines connected to the first analog front-end may be connected to the second analog front-end.

According to some embodiments, each of the plurality of analog front-ends may include a multiplexer connected to three of the second sensor lines and two of the first sensor lines.

According to some embodiments, each of the plurality of analog front-ends may further include a charge amplifier connected to two lines selected in the multiplexer.

According to some embodiments, the charge amplifier may be a fully differential amplifier.

According to some embodiments, each of the plurality of analog front-ends may further include: a band pass filter configured to filter an output signal of the charge amplifier to have a set frequency band; a mixer configured to mix an output signal of the band pass filter and a local clock signal; a low pass filter configured to filter an output signal of the mixer to have a set frequency band; and an analog-digital converter configured to convert an output signal of the low pass filter into a digital signal.

According to some embodiments, a first frame period may include an uplink period, a first active pen sensing period, and a signal processing period. According to some embodiments, a second frame period next to the first frame period may include the uplink period, a second active pen sensing period, the touch sensing period, and the signal processing period.

According to some embodiments, during an entire sensing period of the first active pen sensing period, the sensor device may receive a downlink signal of an active pen from all the first sensors and all the second sensors. According to some embodiments, during the second active pen sensing period, the sensor device may receive the downlink signal of the active pen from some of the first sensors and some of the second sensors.

According to some embodiments, during a partial sensing period of the first active pen sensing period, the sensor device may receive the downlink signal of the active pen from some of the first sensors and some of the second sensors, based on a position of the active pen, which is detected in the entire sensing period.

According to some embodiments, during the second active pen sensing period, the sensor device may receive the downlink signal of the active pen from some of the first sensors and some of the second sensors, based on a position of the active pen, which is detected during the partial sensing period.

According to some embodiments, some of the first sensors and some of the second sensors, which are sensed during the partial sensing period or the second active pen sensing period, may vary based on a moving path of the active pen.

According to some embodiments, when a speed of the active pen increases, a number of some of the first sensors and a number of some of the second sensors, which are sensed during the partial sensing period or the second active pen sensing period, may increase.

According to some embodiments, when the speed of the active pen decreases, the number of some of the first sensors and the number of some of the second sensors, which are sensed during the partial sensing period or the second active pen sensing period, may decrease.

According to some embodiments of the present disclosure, a sensor device includes: first sensors connected to first sensor lines; second sensors connected to second sensor lines, the second sensors intersecting the first sensors; a sensor transmitter connected to the first sensors through the first sensor lines, the sensor transmitter supplying touch driving signals to the first sensors during a touch sensing period; and a sensor receiver connected to the second sensors through the second sensor lines, the sensor receiver receiving touch sensing signals from the second sensors during the touch sensing period, wherein the sensor receiver includes a first analog front-end group and a second analog front-end group, wherein each of a first analog front-end and a second analog front end, which are included in the first analog front-end group, is connected to at least one of the second sensor lines and at least one of the first sensor lines, and wherein each of a third analog front-end and a fourth analog front-end, which are included in the second analog front-end group, is connected to at least one of the first sensor lines, and is not connected to the second sensor lines.

According to some embodiments, one of the second sensor lines connected to the first analog front-end may be connected to the second analog front-end.

According to some embodiments, one of the first sensor lines connected to the first analog front-end may be connected to the second analog front-end.

According to some embodiments, one of the first sensor lines connected to the third analog front-end may be connected to the fourth analog front-end.

According to some embodiments, the second analog front-end group may not operate during the touch sensing period but may operate during an active pen sensing period.

BRIEF DESCRIPTION OF THE DRAWINGS

Aspects of some embodiments of the present disclosure will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
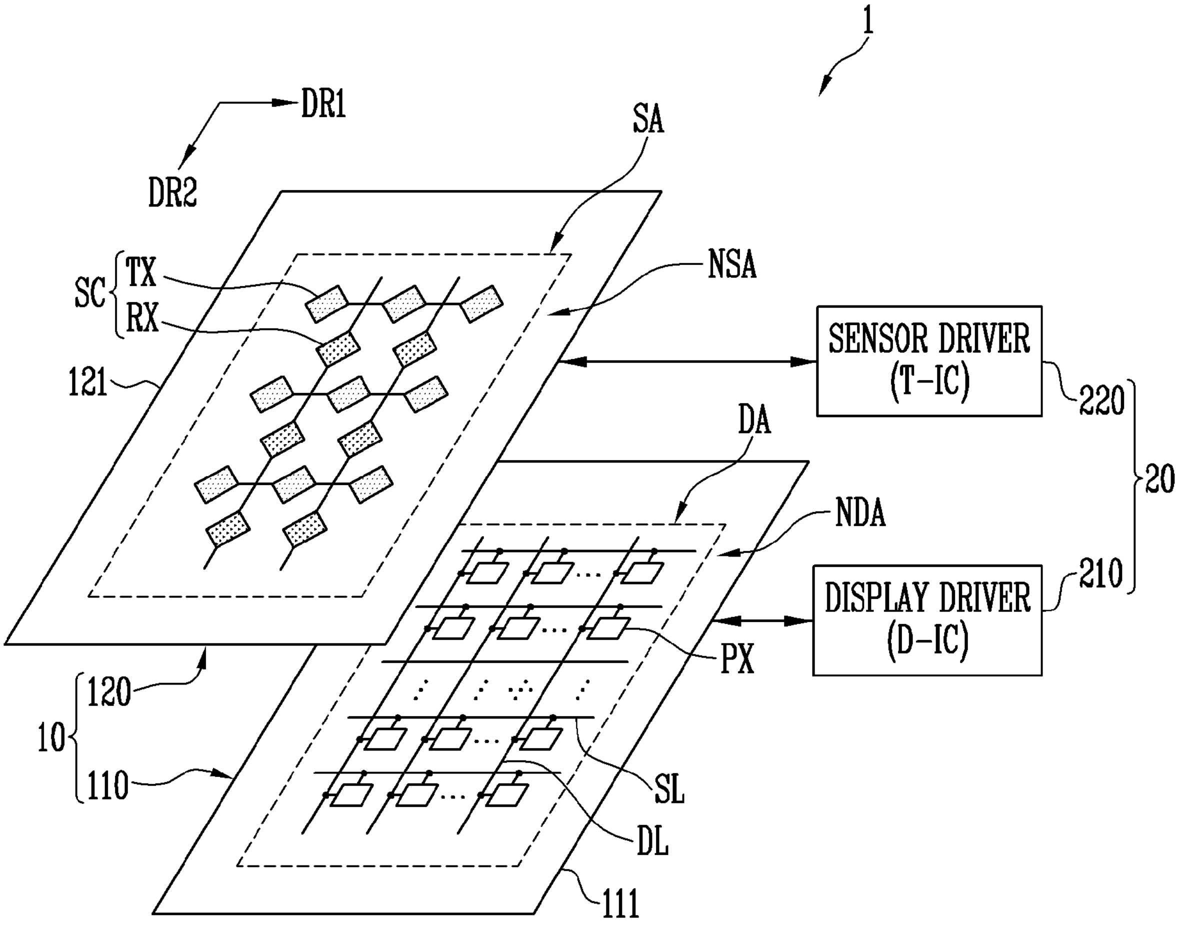
FIGS. 1 and 2 are diagrams illustrating a display device according to some embodiments of the present disclosure.

Hereinafter, aspects of some embodiments are described in more detail with reference to the accompanying drawings so that those skilled in the art may easily practice the present disclosure. Embodiments of the present disclosure may be implemented in various different forms and is not limited to the example embodiments described in the present specification.

Descriptions of some parts or components that are not necessary to describe in order to enable a person having ordinary skill in the art to understand, make, and use the invention may be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

In description, the expression "equal" may mean "substantially equal." That is, this may mean equality to a degree to which those skilled in the art can understand the equality. Other expressions may be expressions in which "substantially" is omitted.

Figure 2:
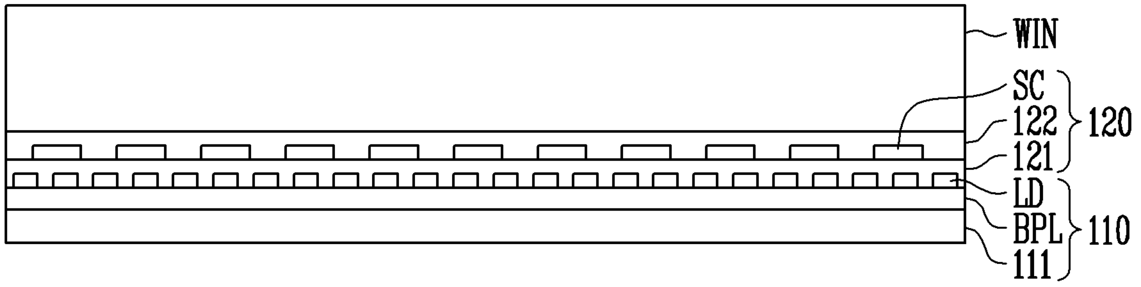

FIGS. 1 and 2 are diagrams illustrating a display device according to some embodiments of the present disclosure.

Referring to FIG. 1, the display device 1 according to some embodiments of the present disclosure may include a panel 10 and a driving circuit 20 for driving the panel 10.

For example, the panel 10 may include a display unit 110 for displaying images and a sensor unit 120 for sensing a touch, a pressure, a fingerprint, hovering, or the like. For example, the panel 10 may include pixels PX and sensors SC located while overlapping with at least some of the pixels PX. According to some embodiments, the sensors SC may include first sensors TX and second sensors RX. According to some embodiments (e.g., a self-capacitance type), the sensors SC may be configured with one kind of sensors without distinguishing the first and second sensors from each other. The driving circuit 20 may include a display driver 210 for driving the display unit 110 and a sensor driver 220 for driving the sensor unit 120. For example, the pixels PX may display images by using a display frame period as a unit. For example, the sensors SC may sense an input of a user by using a sensing frame period as a unit. The sensing frame period and the display frame period may be the same. Meanwhile, the sensing frame period and the display frame period may be independent from each other or be different from each other. The sensing frame period and the display frame period may be synchronized with each other or be unsynchronized.

According to some embodiments, after the display unit 110 and the sensor unit 120 are manufactured separately from each other, the display unit 110 and the sensor unit 120 may be arranged and/or coupled to overlap with each other in at least one area. Alternatively, according to some embodiments, the display unit 110 and the sensor unit 120 may be integrally manufactured. For example, the sensor unit 120 may be formed directly on at least one substrate (e.g., an upper substrate and/or a lower substrate of a display panel, or a thin film encapsulation layer) which constitutes the display unit 110, or another insulating layer or one of various types of functional layers (e.g., an optical layer or a protective layer).

Meanwhile, although a case where the sensor unit 120 is located on a front surface (e.g., an upper surface on which an image is displayed) of the display unit 110 is illustrated in FIG. 1, the position of the sensor unit 120 is not limited thereto. For example, according to some embodiments, the sensor unit 120 may be located on a rear surface or both surfaces of the display unit 110. According to some embodiments, the sensor unit 120 may be located in at least one edge area of the display unit 110.

The display unit 110 may include a display substrate 111 and a plurality of pixels PX formed on the display substrate 111. The pixels PX may be located in a display area DA of the display substrate 111.

The display substrate 111 may include the display area DA at which images are displayed and a non-display area NDA in a periphery (e.g., outside a footprint) of the display area DA. In some embodiments, the display area DA may be located in a central area of the display unit 110, and the non-display area NDA is located in an edge area of the display unit 110 to surround the display area DA.

The display substrate 111 may be a rigid substrate or a flexible substrate, and the material or property of the display substrate 111 is not particularly limited. For example, the display substrate 111 may be a rigid substrate made of glass or tempered glass, or a flexible substrate configured with a thin film made of plastic or metal.

Scan lines SL and data lines DL, and the pixels PX connected to the scan lines SL and the data lines DL are located in the display area DA. Pixels PX are selected by a scan signal having a turn-on level, which is supplied from the scan lines SL, to be supplied with a data signal from the data lines DL, and emit light with a luminance corresponding to the data signal. Accordingly, an image corresponding to the data signal is displayed in the display area DA. In the present disclosure, the structure, driving method, and the like of the pixels PX are not particularly limited. For example, each of the pixels PX may be implemented as a pixel having various structures and/or various driving methods, which are currently known in the art.

Various types of lines and/or a built-in circuit, connected to the pixels PX of the display area DA, may be located in the non-display area NDA. In an example, a plurality of lines for supplying various power sources and various control signals to the display area DA may be located in the non-display area NDA. In addition, a scan driver and the like may be further located in the non-display area NDA.

In the present disclosure, the kind of the display unit 110 is not particularly limited. For example, the display unit 110 may be implemented as a self-luminous display panel such as an organic light emitting display panel. However, when the display unit 110 is implemented as a self-luminescent display panel, each pixel is not necessarily limited to a case where the pixel includes only an organic light emitting element. For example, the light emitting element of each pixel may be configured as an organic light emitting diode, an inorganic light emitting diode, a quantum dot/well light emitting diode, or the like. A plurality of light emitting elements may be provided in each pixel. The plurality of light emitting elements may be connected in series, parallel, series/parallel, or the like. Alternatively, the display unit 110 may be implemented as a non-light emitting display panel such as a liquid crystal display panel. When the display unit 110 is implemented as a non-light emitting display panel, the display device 1 may additionally include a light source such as a back-light unit.

The sensor unit 120 may include a sensor substrate 121 and a plurality of sensors SC formed on the sensor substrate 121. The sensors SC may be located in a sensing area SA on the sensor substrate 121.

The sensor substrate 121 may include the sensing area SA capable of sensing a touch input or the like and a peripheral area NSA at the periphery of the sensing area SA. In some embodiments, the sensing area SA may be arranged to overlap with at least one area of the display area DA. In an example, the sensing area SA may be set as an area corresponding to the display area DA (e.g., an area overlapping with the display area DA), and the peripheral area NSA may be set as an area corresponding to the non-display area NDA (e.g., an area overlapping with the non-display area NDA). When a touch input or the like is provided on the display area DA, the touch input may be detected through the sensor unit 120. In some embodiments, when an input of an active pen is provided on the display area DA, the input of the active pen may be detected through the sensor unit 120.

The sensor substrate 121 may be a rigid or flexible substrate. In addition, the sensor substrate 121 may be configured with at least one insulating layer. Also, the sensor substrate 121 may be a transparent or translucent light transmission substrate, but embodiments according to the present disclosure are not limited thereto. That is, in the present disclosure, the material and property of the sensor substrate 121 are not particularly limited. For example, the sensor substrate 121 may be a rigid substrate configured with glass or tempered glass, or a flexible substrate configured with a thin film made of plastic or metal. In some embodiments, at least one substrate (e.g., the display substrate 111, an encapsulation substrate, and/or a thin film encapsulation layer) which constitutes the display unit 110, or at least one insulating layer, at least one functional layer, or the like, which is located at the inside and/or an outer surface of the display unit 110, may be used as the sensor substrate 121.

The sensing area SA is set as an area capable of reacting with a touch input (i.e., an active area of sensors). To this end, the sensors SC for sensing a touch input or the like may be located in the sensing area SA. In some embodiments, the sensors SC may include the first sensors TX and the second sensors RX.

For example, each of the first sensors TX may extend in a first direction DR1. The first sensors TX may be arranged in a second direction DR2. The second direction DR2 may be different from the first direction DR1. For example, the second direction DR2 may be a direction orthogonal to the first direction DR1. According to some embodiments, the extending direction and arrangement direction of the first sensors TX may follow another conventional configuration. Each of the first sensors TX may have a form in which first cells having a relatively wide area and first bridges having a relatively narrow area are connected to each other. Although a case where each of the first cells has a diamond shape is illustrated in FIG. 1, each of the first cells may be configured in various conventional shapes including a circular shape, a quadrangular shape, a triangular shape, a mesh shape, and the like. For example, the first bridges may be integrally formed with the first cells on the same layer. According to some embodiments, the first bridges may be formed in a layer different from a layer of the first cells, to electrically connect adjacent first cells to each other.

For example, each of the second sensors RX may extend in the second direction DR2. The second sensors RX may be arranged in the first direction DR1. According to some embodiments, the extending direction and arrangement direction of the second sensors RX may follow another conventional configuration. Each of the second sensors RX may have a form in which second cells having a relatively wide area and second bridges having a relatively narrow area are connected to each other. Although a case where each of the second cells has a diamond shape is illustrated in FIG. 1, each of the first cells may be configured in various conventional shapes including a circular shape, a quadrangular shape, a triangular shape, a mesh shape, and the like. For example, the second bridges may be integrally formed with the second cells on the same layer. According to some embodiments, the second bridges may be formed in a layer different from a layer of the second cells, to electrically connect adjacent second cells to each other.

In some embodiments, each of the first sensors TX and the second sensors RX may include at least one of a metal material, a transparent conductive material, or various other conductive materials, thereby having conductivity. In an example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), platinum (Pt), and the like, or alloys thereof. The first sensors TX and the second sensors RX may be configured in a mash shape. Also, the first sensors TX and the second sensors RX may include at least one of various transparent conductive materials including silver nano wire (AgNW), Indium Tin Oxide (ITO), Indium Zinc Oxide (IZO), Indium Gallium Zinc Oxide (IGZO), Antimony Zinc Oxide (AZO), Indium Tin Zinc Oxide (ITZO), Zinc Oxide (ZnO), Tin Oxide ($SnO_2$), carbon nano tube, graphene, and the like. In addition, the first sensors TX and the second sensors RX may include at least one of various conductive materials, thereby having conductivity. Also, each of the first sensors TX and the second sensors RX may be configured as a single layer or a multi-layer, and a sectional structure thereof is not particularly limited.

Meanwhile, sensor lines for electrically connecting the sensors SC to the sensor driver 220, and the like may be concentrically arranged in the peripheral area NSA.

The driving circuit 20 may include the display driver 210 for driving the display unit 110 and the sensor driver 220 for driving the sensor unit 120. According to some embodiments, the display driver 210 and the sensor driver 220 may be configured as Integrated Chips (ICs) separate from each other. According to some embodiments, at least a portion of the display driver 210 and at least a portion of the sensor driver 220 may be integrated together in one IC.

The display driver 210 is electrically connected to the display unit 110 to drive the pixels PX. For example, the display driver 210 may include a data driver and a timing controller, and a scan driver may be separately mounted in the non-display area NDA of the display unit 110. According to some embodiments, the display driver 210 may include all or at least some of the data driver, the timing controller, and the scan driver. According to some embodiments, the display driver 210 may correspond to at least one of a Graphic Processing Unit (GPU), a Central Processing Unit (CPU), an Application Processor (AP), and the like. According to some embodiments, the display driver 210 may indicate a set of at least one of the GPU, the CPU, or the AP and the timing controller.

The sensor driver 220 is electrically connected to the sensor unit 120 to drive the sensor unit 120. The sensor driver 220 may include a sensor transmitter and a sensor receiver. In some embodiments, the sensor transmitter and the sensor receiver may be integrated in one IC, but the present disclosure is not limited thereto.

Referring to FIG. 2, for example, the sensor unit 120 may be stacked on the top of the display unit 110, and a window WIN may be stacked on the top of the sensor unit 120.

The display unit 110 may include a display substrate 111, a circuit element layer BPL formed on the display substrate 111, and light emitting elements LD formed on the circuit element layer BPL. The circuit element layer BPL may include pixel circuits for driving light emitting elements LD of pixels PX, scan lines SL, data lines DL, and the like.

The sensor unit 120 may include a sensor substrate 121, sensors SC formed on the sensor substrate 121, and a protective layer 122 covering the sensors SC. In the embodiments shown in FIG. 2, the sensor substrate 121 may be illustrated in the form of an encapsulation layer covering the pixels PX. According to some embodiments, the sensor substrate 121 may exist separately from the encapsulation layer covering the pixels PX.

The window WIN is a protective member located at the uppermost end of the module of the display device 1, and may be substantially a transparent light transmission substrate. The window WIN may have a multi-layered structure selected from a glass substrate, a plastic film, and a plastic substrate. The window WIN may include a rigid or flexible material, and the material constituting the window WIN is not particularly limited.

According to some embodiments, the display device 1 may further include a polarizing plate (or another kind of anti-reflection layer) for preventing reflection of external light between the window WIN and the sensor unit 120.

Figure 3:
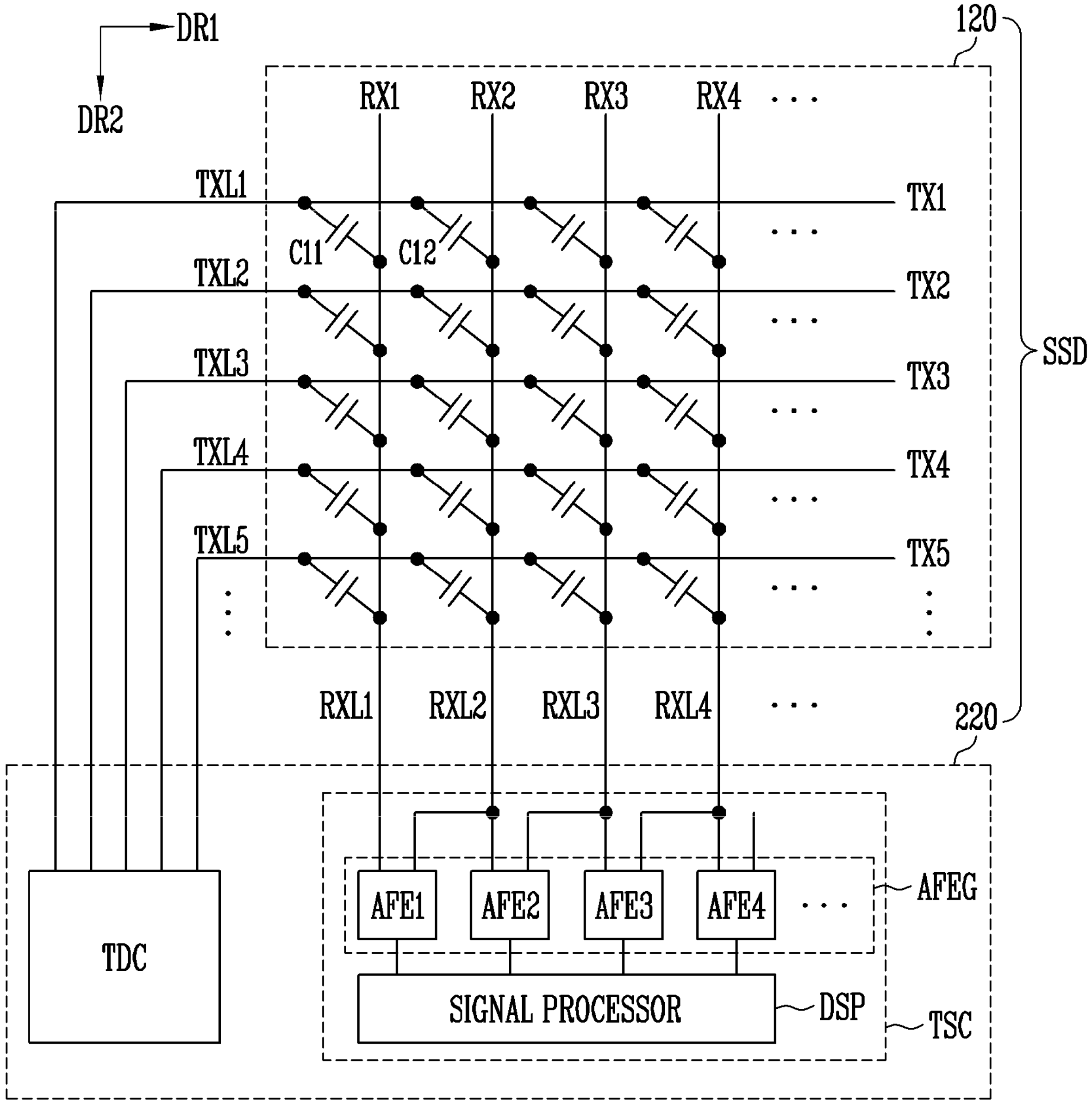
FIG. 3 is a diagram illustrating a sensor device according to some embodiments of the present disclosure.

FIG. 3 is a diagram illustrating a sensor device according to some embodiments of the present disclosure.

Referring to FIG. 3, the sensor device SSD according to some embodiments of the present disclosure may include a sensor unit 120 and a sensor driver 220. The sensor device SSD may be included in the display device 1. Meanwhile, the sensor device SSD may be configured as a separate independent product, regardless of the display device 1.

The sensor unit 120 may include first sensors TX1, TX2, TX3, TX4, and TX5 and second sensors RX1, RX2, RX3, and RX4. The first sensors TX1 to TX5 may extend in the first direction DR1, and be arranged parallel to each other in the second direction DR2. The second sensors RX1 to RX4 may extend in the second direction DR2, and be arranged parallel to each other in the first direction DR1. The second sensors RX1 to RX4 may intersect the first sensors TX1 to TX5. The first sensors TX1 to TX5 and the second sensors RX1 to RX4 may form mutual capacitances. For example, a capacitance C11 may be formed between a first sensor TX1 and a second sensor RX1, and a capacitance C12 may be formed between the first sensor TX1 and a second sensor RX2. The sensor driver 220 may sense a change in the capacitances C11 and C12, thereby determining whether a touch of a user has been input, or the like.

The sensor driver 220 may include a sensor transmitter TDC and a sensor receiver TSC. The sensor transmitter TDC may be connected to the first sensors TX1 to TX5, and supply driving signals to the first sensors TX1 to TX5. The sensor transmitter TDC may be connected to the first sensors TX1 to TX5 through first sensor lines TXL1, TXL2, TXL3, TXL4, and TXL5.

The sensor receiver TSC may be connected to the second sensors RX1 to RX4, and receive sensing signals from the second sensors RX1 to RX4. The sensor receiver TSC may be connected to the second sensors RX1 to RX4 through second sensor lines RXL1, RXL2, RXL3, and RXL4. The sensor receiver TSC may include an analog front-end group AFEG and a signal processor DSP.

The analog front-end group AFEG may include a plurality of analog front-ends AFE1, AFE2, AFE3, and AFE4. Each of the analog front-ends AFE1, AFE2, AFE3, and AFE4 may be connected to two adjacent second sensors among the second sensors RX1 to RX4. For example, a first analog front-end AFE1 may be connected to the second sensor RX1 and the second sensor RX2. A second analog front-end AFE2 may be connected to the second sensor RX2 and a second sensor RX3. A third analog front-end AFE3 may be connected to the second sensor RX3 and the second sensor RX4. A fourth analog front-end AFE4 may be connected to the second sensor RX4 and a second sensor. Each of the analog front-ends AFE1, AFE2, AFE3, and AFE4 generates a digital signal from which a common noise is removed by using sensing signals of adjacent second sensors as differential signals, so that a Signal to Noise Ratio (SNR) can be increased.

The signal processor DSP may calculate sensing values by using digital signals provided from the analog front-end group AFEG. For example, a digital signal provided from the first analog front-end AFE1 may correspond to a difference between a level lv2 of a sensing signal of the second sensor RX2 and a level lv1 of a sensing signal of the second sensor RX1 (lv2–lv1). A digital signal provided from the second analog front-end AFE2 may correspond to a difference between a level lv3 of a sensing signal of the second sensor RX3 and the level lv2 of the sensing signal of the second sensor RX2 (lv3–lv2). A digital signal provided from the third analog front-end AFE3 may correspond to a difference between a level lv4 of a sensing signal of the second sensor RX4 and the level lv3 of the sensing signal of the second sensor RX3 (lv4–lv3).

For example, the signal processor DSP may calculate a relative level lv2' of the sensing signal of the second sensor RX2, a relative level lv3' of the sensing signal of the second sensor RX3, and a relative level lv4' of the sensing signal of the second sensor RX4, by using the following Equation 1 to Equation 3.

$$lv2' = lv2 - lv1 \quad \text{Equation 1}$$

$$lv3' = lv3 - lv1 = (lv3 - lv2) + (lv2 - lv1) \quad \text{Equation 2}$$

$$lv4' = lv4 - lv1 = (lv4 - lv3) + (lv3 - lv2) + (lv2 - lv1) \quad \text{Equation 3}$$

The signal processor DSP may determine whether a touch of a user has been input, or the like, by using the levels lv2', lv3', and lv4' as sensing values, or transfer the sensing values to the display driver 210.

Figure 4:
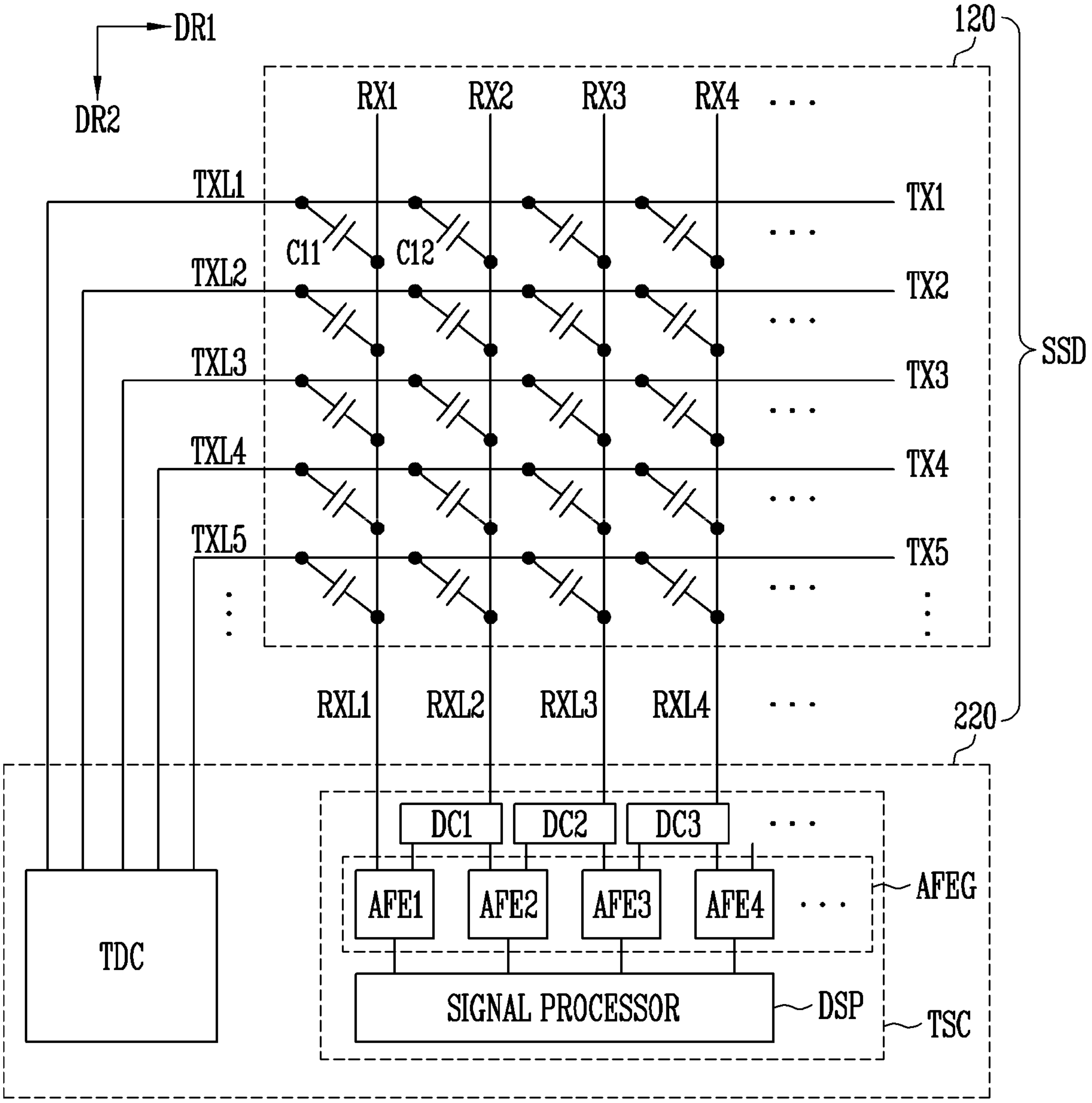
FIG. 4 is a diagram illustrating a sensor device according to some embodiments of the present disclosure.

FIG. 4 is a diagram illustrating a sensor device according to some embodiments of the present disclosure.

A sensor receiver TSC shown in FIG. 4 is different from the sensor receiver TSC shown in FIG. 3, in that the sensor receiver TSC shown in FIG. 4 further includes distribution circuits DC1, DC2, and DC3.

The distribution circuits DC1, DC2, and DC3 may be located between at least some of second sensors RX1 to RX4 and analog front-ends AFE1 to AFE4, generate a plurality of signals having the same magnitude (e.g., the same voltage level or the same current amount), based on each of sensing signals provided from the at least some of the second sensors RX1 to RX4, and distribute the generated signals to the analog front-ends AFE1 to AFE4. For example, the distribution circuits DC1, DC2, and DC3 may be configured to include an amplifier, a buffer, and the like, and amplify or mirror each of the sensing signals, thereby outputting the amplified or mirrored sensing signals.

For example, a first distribution circuit DC1 may receive a second sensing signal provided from a second sensor RX2, and provide signals having the same magnitude as the second sensing signal respectively to a first analog front-end AFE1 and a second analog front-end AFE2. When the second sensing signal does not pass through the first distribution circuit DC1, the second sensing signal may be simultaneously supplied to the first analog front-end AFE1 and the second analog front-end AFE2. Therefore, a magnitude of the second sensing signal may be different from that of a first sensing signal received from a second sensor RX1 due to a relative increase in load with respect to the second sensing signal. For example, the magnitude of the second sensing signal may be smaller than that of the first sensing signal. Therefore, according to some embodiments, signals having the same magnitude as the second sensing signal may be respectively provided to the first analog front-end AFE1 and the second analog front-end AFE2 by using the first distribution circuit DC1.

Similarly, a second distribution circuit DC2 may receive a third sensing signal provided from a second sensor RX3, and provide signals having the same magnitude as the third sensing signal respectively to the second analog front-end AFE2 and a third analog front-end AFE3. A third distribution circuit DC3 may receive a fourth sensing signal provided from a second sensor RX4, and provide signals having the same magnitude as the fourth sensing signal respectively to the third analog front-end AFE3 and a fourth analog front-end AFE4.

Figure 5:
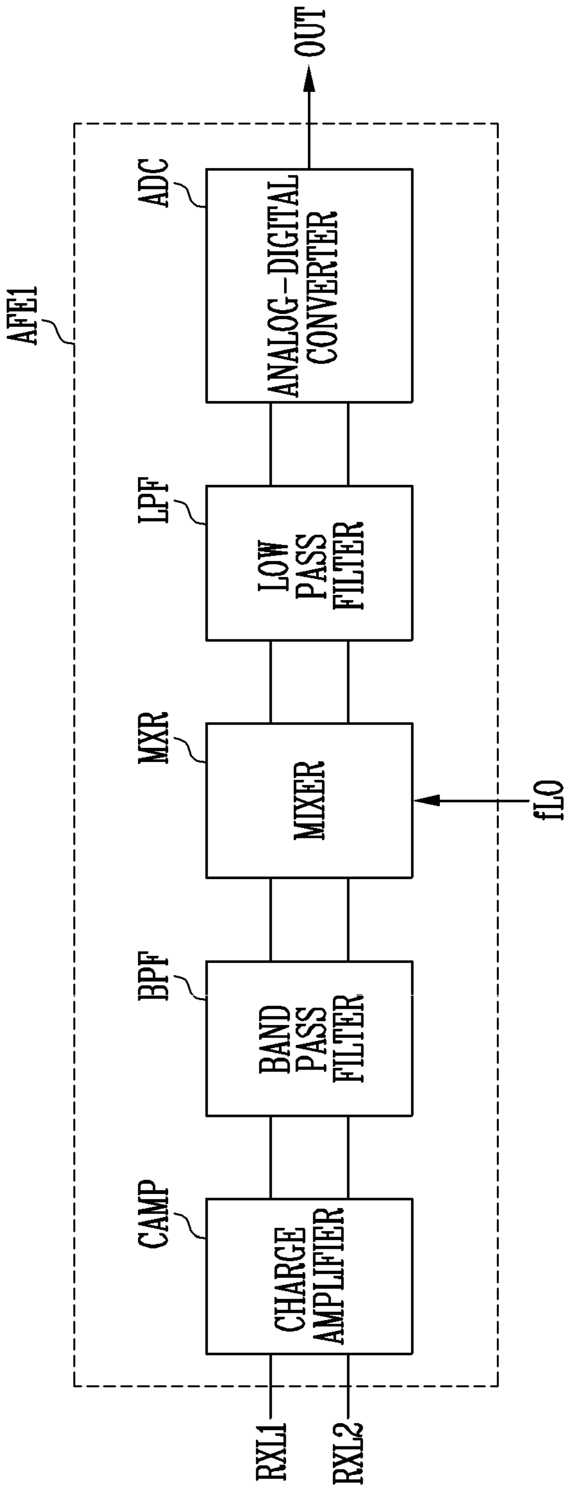
FIG. 5 is a diagram illustrating an analog front-end of the embodiments shown in FIG. 4 according to some embodiments of the present disclosure.

FIG. 5 is a diagram illustrating an example analog front-end of the embodiments shown in FIG. 4.

Referring to FIG. 5, a first analog front-end AFE1 according to some embodiments of the present disclosure may include a charge amplifier CAMP, a band pass filter BPF, a mixer MXR, a low pass filter LPF, and an analog-digital converter ADC. The other analog front-ends AFE2, AFE3, and AFE4 may have the same configuration as the first analog front-end AFE1, except only second sensors connected thereto, and therefore, some repetitive descriptions may be omitted (see FIGS. 3 and 4).

The charge amplifier CAMP may receive sensing signals from two sensors RX1 and RX2 among the second sensors RX1 to RX4. For example, a first input terminal of the charge amplifier CAMP may be connected to the second sensor line RXL1, and a second input terminal of the charge amplifier CAMP may be connected to the second sensor line RXL2. Therefore, the charge amplifier CAMP may output a signal corresponding to a difference between a level of a sensing signal of the second sensor RX2 and a level of a sensing signal of the second sensor RX1. The charge amplifier CAMP may be configured as a fully differential amplifier, to output the signal corresponding to the difference between the level of the sensing signal of the second sensor RX2 and the level of the sensing signal of the second sensor RX1 and an inverted signal thereof. In FIG. 5, two internal signal lines parallel to each other are illustrated by assuming that the elements BPF, MXR, LPF, and ADC connected to an output terminal of the charge amplifier CAMP have specifications requiring an input signal and an inverted input signal. Each of the elements BPF, MXR, LPF, and ADC can remove common mode noise by using the input signal and the inverted input signal.

However, according to some embodiments, the elements BPF, MXR, LPF, and ADC may be configured with specifications requiring only the input signal without the inverted input signal. The output terminal of the charge amplifier CAMP may be configured as a single-ended terminal, to output only the signal corresponding to the difference between the level of the sensing signal of the second sensor RX2 and the level of the sensing signal of the second sensor RX1. According to some embodiments, one internal signal line connecting the charge amplifier CAMP and each of the elements BPF, MXR, LPF, and ADC to each other will be illustrated.

The band pass filter BPF may be connected to the output terminal of the charge amplifier CAMP. The band pass filter BPF may filter an output signal of the charge amplifier CAMP to have a set frequency band. For example, the frequency band may be predetermined to include a frequency (or central frequency) of sensing signals, and noise components may be located at the outside of the frequency band. The central frequency of the sensing signals may be the same as a central frequency of driving signals.

The mixer MXR may mix an output signal of the band pass filter BPF and a local clock signal fLO. The mixer MXR may include frequency components corresponding to a difference and a sum of a frequency of the output signal of the band pass filter BPF and a frequency of the local clock signal fLO. For example, when the frequency of the output signal of the band pass filter BPF and the frequency of the local clock signal fLO are the same, an output signal of the mixer MXR may include a frequency component having 0 Hz as the central frequency.

The low pass filter LPF may filter the output signal of the mixer MXR to have a set frequency band. The set frequency band of the low pass filter LPF may be lower than that of the band pass filter LPF. For example, the low pass filter LPF may allow only a signal of a low frequency band having 0 Hz as the central frequency in the output signal of the mixer MXR to pass therethrough. Accordingly, the low pass filter LPF can filter frequency components corresponding to noise.

The analog-digital converter ADC may convert an output of the low pass filter LPF into a digital signal OUT. Because the analog-digital converter ADC receives the signal of the low frequency band from the low pass filter LPF, the analog-digital converter ADC can operate at a small sampling rate, and the frequency of a clock signal can be low. Accordingly, the analog-digital converter ADC may have advantages in terms of power cost and configuration cost.

The signal processor DSP may determine final sensing values by using a digital signal OUT output from each of the analog front-ends AFE1, AFE2, AFE3, and AFE4 (see FIG. 3 and Equations 1 to 3).

Figure 6:
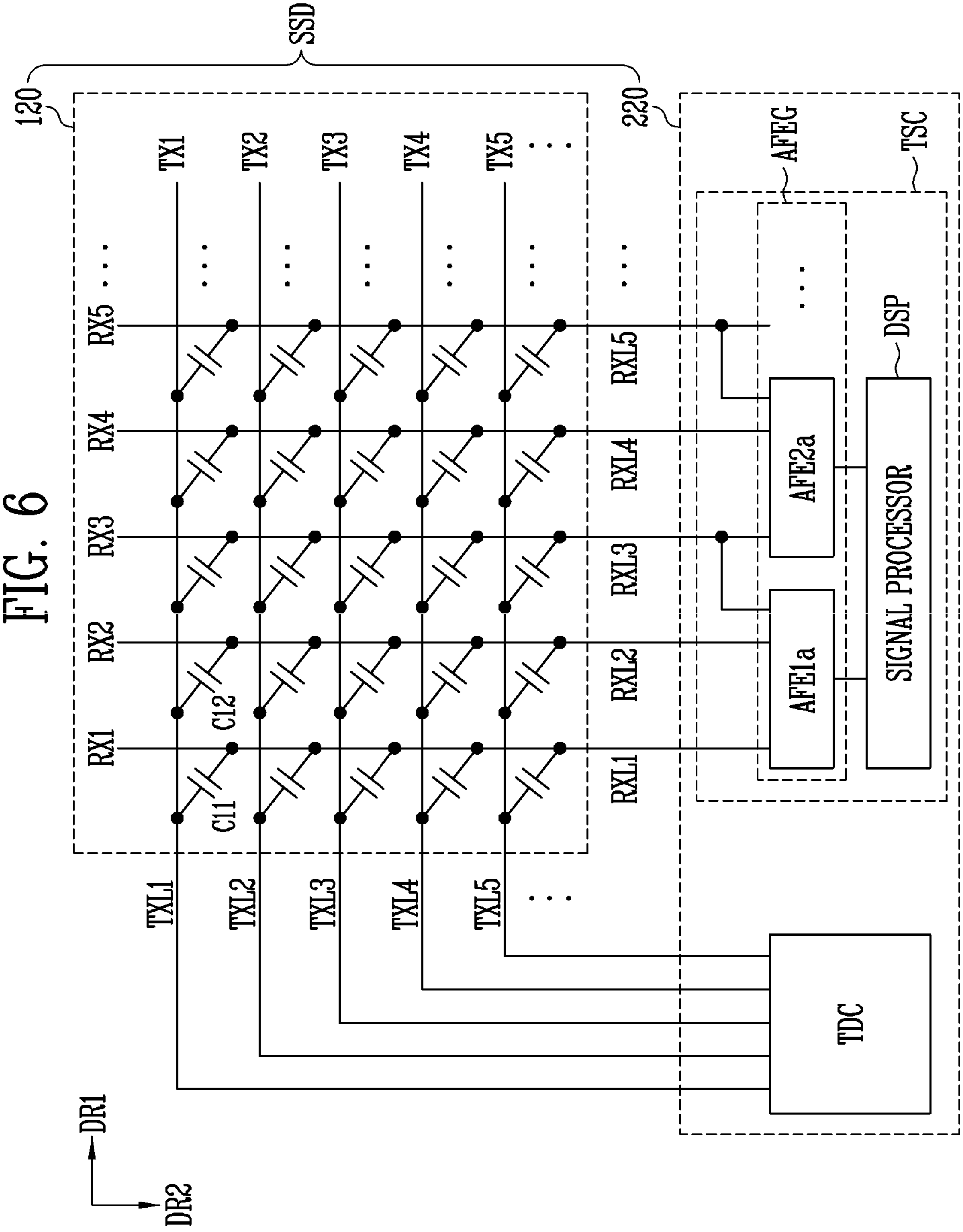
FIG. 6 is a diagram illustrating a sensor device according to some embodiments of the present disclosure.

FIG. 6 is a diagram illustrating a sensor device according to some embodiments of the present disclosure.

In the drawings from FIG. 6, for convenience of description, it is illustrated that a sensor unit 120 further includes a second sensor RX5 and a second sensor line RXL5. Configurations of the sensor units 120 shown in FIGS. 3, 4, and 6 are substantially the same.

An analog front-end group AFEG shown in FIG. 6 may include a plurality of analog front-ends AFE1*a* and AFE2*a*. Descriptions of components overlapping with those described above will be omitted.

For example, each of the plurality of analog front-ends AFE1*a* and AFE2*a* may be connected to three of the second sensor lines RXL1 to RXL5. A first analog front-end AFE1*a* may be connected to the second sensor lines RXL1, RXL2, and RXL3, and a second analog front-end AFE2*a* may be connected to the second sensor lines RXL3, RXL4, and RXL5.

For example, one RXL3 of the second sensor lines RXL1, RXL2, and RXL3 connected to the first analog front-end AFE1*a* may be connected to the second analog front-end AFE2*a*.

Figure 7:
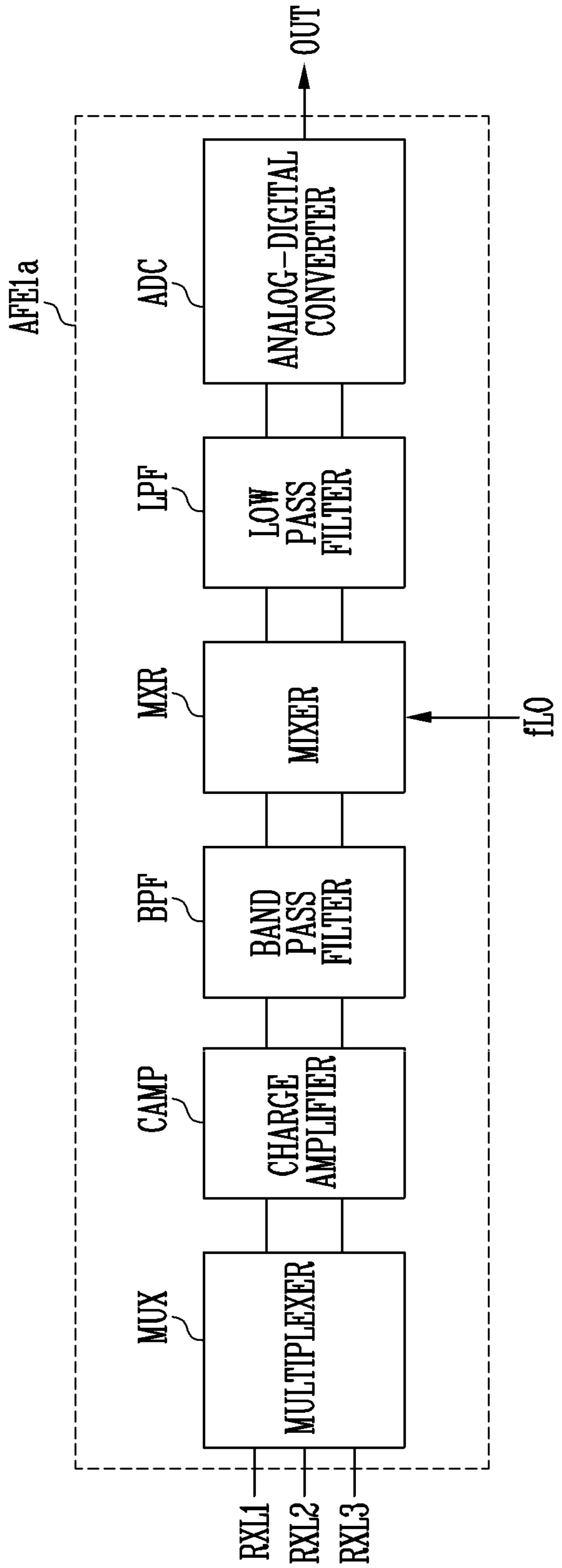
FIG. 7 is a diagram illustrating an analog front-end of the embodiments shown in FIG. 6 according to some embodiments of the present disclosure.

FIG. 7 is a diagram illustrating an example analog front-end of the embodiments shown in FIG. 6.

A first analog front-end AFE1*a* shown in FIG. 7 may further include a multiplexer MUX as compared with the first analog front-end AFE1 shown in FIG. 5. Descriptions of components overlapping with those described above will be omitted.

The multiplexer MUX may be connected to three second sensor lines RXL1, RXL2, and RXL3 and a charge amplifier CAMP. For example, in a first period, the multiplexer MUX of the first analog front-end AFE1*a* may connect two second sensor lines RXL1 and RXL2 to input terminals of the charge amplifier CAMP. A multiplexer MUX of a second analog front-end AFE2*a* may connect two second sensor lines RXL3 and RXL4 to input terminals of a charge amplifier CAMP. Accordingly, the signal processor DSP may receive digital signals OUT of a half of the second sensor lines.

For example, in a second period next to the first period, the multiplexer MUX of the first analog front-end AFE1*a* may connect two second sensor lines RXL2 and RXL3 to the input terminals of the charge amplifier CAMP. The multiplexer MUX of the second analog front-end AFEa may connect two second sensor lines RXL4 and RXL5 to the input terminals of the charge amplifier CAMP. Accordingly, the signal processor DSP may receive digital signals OUT of the other half of the second sensor lines.

As such, during a touch sensing period, the sensor driver 220 is driven by time-dividing the touch sensing period into the first period and the second period, so that the signal processor DSP can determine final sensing values of the entire sensor unit 120. In accordance with the embodiments shown in FIG. 6, the number of analog front-ends AFE1*a* and AFE2*a* can be decreased by a half as compared with the embodiments shown in FIG. 3 or 4. Thus, configuration cost can be reduced.

Figure 8:
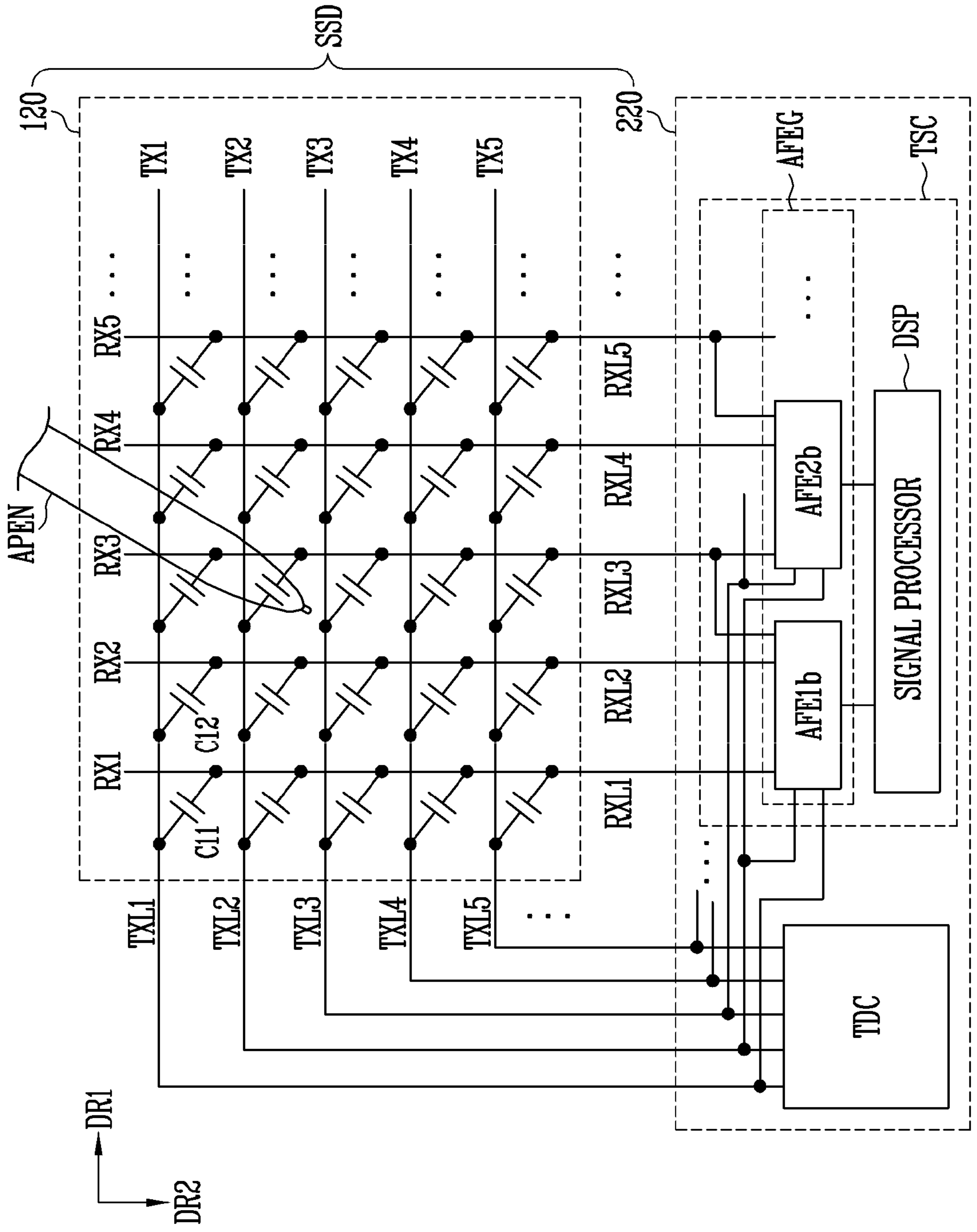
FIG. 8 is a diagram illustrating a sensor device according to some embodiments of the present disclosure.

FIG. 8 is a diagram illustrating a sensor device according to some embodiments of the present disclosure.

An analog front-end group AFEG shown in FIG. 8 may include a plurality of analog front-ends AFE1*b* and AFE2*b*.

Descriptions of components overlapping with those described above will be omitted.

Each of the plurality of analog front-ends AFE1*b* and AFE2*b* may be connected to at least one of second sensor lines RXL1 to RXL5 and at least one of first sensor lines TXL1 to TLX5. For example, each of the plurality of analog front-ends AFE1*b* and AFE2*b* may be connected to three of the second sensor lines RXL1 to RXL5 and two of the first sensor lines TXL1 to TLX5. For example, a first analog front-end AFE1*b* may be connected to second sensor lines RXL1, RXL2, and RXL3 and first sensor lines TXL1 and TXL2. Meanwhile, a second analog front-end AFE2*b* may be connected to second sensor lines RXL3, RXL4, and RXL5 and first sensor lines TXL2 and TXL3.

One RXL3 of the second sensor lines RXL1, RXL2, and RXL3 connected to the first analog front-end AFE1*b* may be connected to the second analog front-end AFE2*b*. In addition, one TXL2 of the first sensor lines TXL1 and TXL2 connected to the first analog front-end AFE1*b* may be connected to the second analog front-end AFE2*b*.

In accordance with the embodiments shown in FIG. 8, the sensor device SSD may perform sensing on an active pen APEN in addition to touch sensing. Also, the sensor device SSD may perform sensing on an active device for transmitting/receiving an electromagnetic signal to/from the sensor unit 120, in addition to the active pen APEN.

Figure 9:
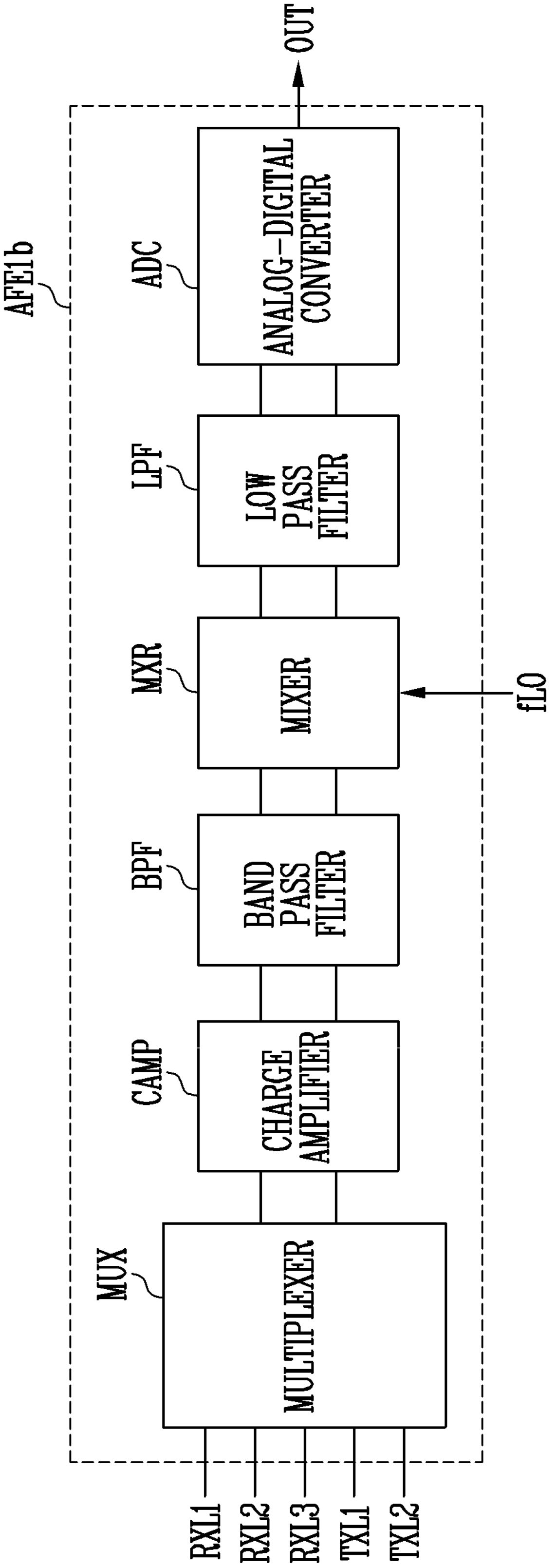
FIG. 9 is a diagram illustrating an analog front-end of the embodiments shown in FIG. 8 according to some embodiments of the present disclosure.

FIG. 9 is a diagram illustrating an example analog front-end of the embodiments shown in FIG. 8.

A first analog front-end AFE1*b* shown in FIG. 9 may further include a multiplexer MUX as compared with the first analog front-end AFE1 shown in FIG. 5. Descriptions of components overlapping with those described above will be omitted.

The multiplexer MUX may be connected to three second sensor lines RXL1, RXL2, and RXL3, two first sensor lines TXL1 and TXL2, and a charge amplifier CAMP. An operation of the multiplexer MUX will be described with further reference to FIGS. 10 to 15.

Figure 10:
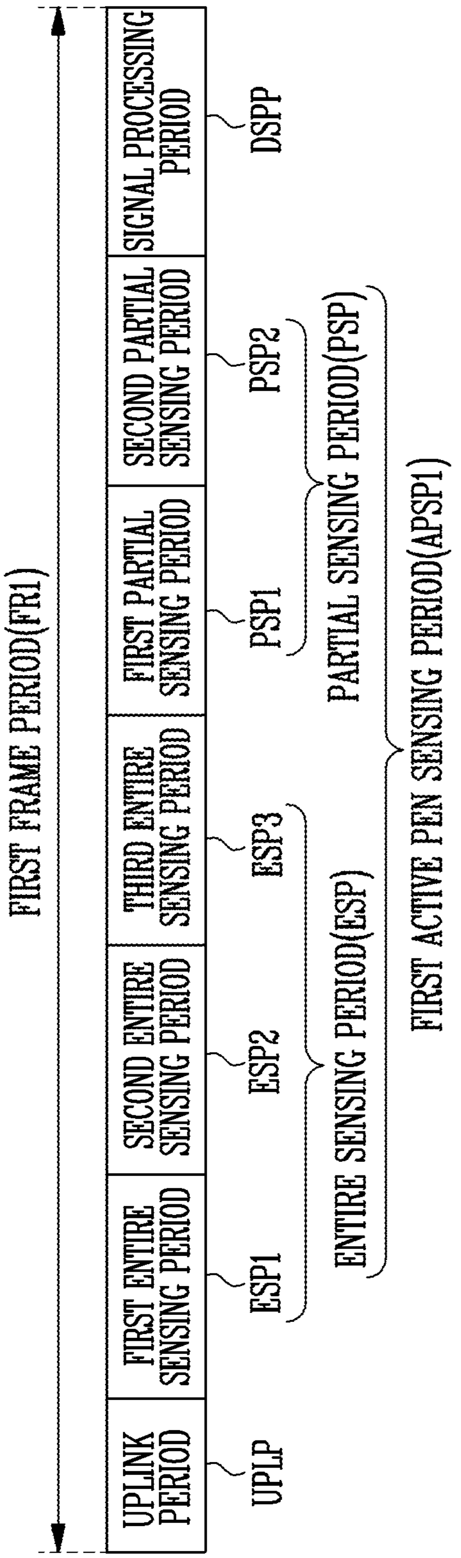
FIG. 10 is a diagram illustrating a first frame period according to some embodiments of the present disclosure.

FIG. 10 is a diagram illustrating a first frame period according to some embodiments of the present disclosure. FIGS. 11 to 14 are diagrams illustrating an entire sensing period of the first frame period. FIG. 15 is a diagram illustrating a partial sensing period of the first frame period.

The first frame period FR1 may include an uplink period UPLP, a first active pen sensing period APSP1, and a signal processing period DSPP. A frame period may mean a sensing frame period required when the sensor unit 120 is sensed at least once. As described above, the sensing frame period and the display frame period may be the same. Meanwhile, the sensing frame period and the display frame period may be independent from each other or be different from each other. The sensing frame period and the display frame period may be synchronized with each other or be unsynchronized.

During the uplink period UPLP, at least some of the first sensors TX1 to TX5 and the second sensors RX1 to RX5 may transmit an uplink signal. For example, only the first sensors TX1 to TX5 may transmit the uplink signal, and only the second sensors RX1 to RX5 may transmit the uplink signal. Both the first sensors TX1 to TX5 and the second sensors RX1 to RX5 may transmit the uplink signal. An uplink signal transmitter may be connected to at least some of the first sensors TX1 to TX5 and the second sensors RX1 to RX5, which transmit the uplink signal. Meanwhile, the sensor transmitter TDC may be configured to serve as the uplink signal transmitter.

The first active peen sensing period APSP1 may be a period in which the sensor device SSD receives or wait for a downlink signal. The active pen APEN receiving the uplink signal during the uplink period UPLP may transmit a downlink signal. The downlink signal may be variously configured according to a protocol. For example, in a Universal Stylus Interactive (USI) protocol, the downlink signal may include an approval signal, a position signal, and a data signal. In another example, in an Active Electrostatic Solution (AES) protocol, the downlink signal may include a position signal and a data signal. In another example, the downlink signal may further include a slope signal. In addition, the downlink signal may be defined by various protocols known in the art.

During an entire sensing period ESP of the first active pen sensing period APSP1, the sensor device SSD may receive the downlink signal of the active pen APEN from all the first sensors TX1 to TX5 and all the second sensors RX1 to RX5.

The entire sensing period ESP may include a first entire sensing period ESP1, a second entire sensing period ESP2, and a third entire sensing period ESP3.

Figure 11:
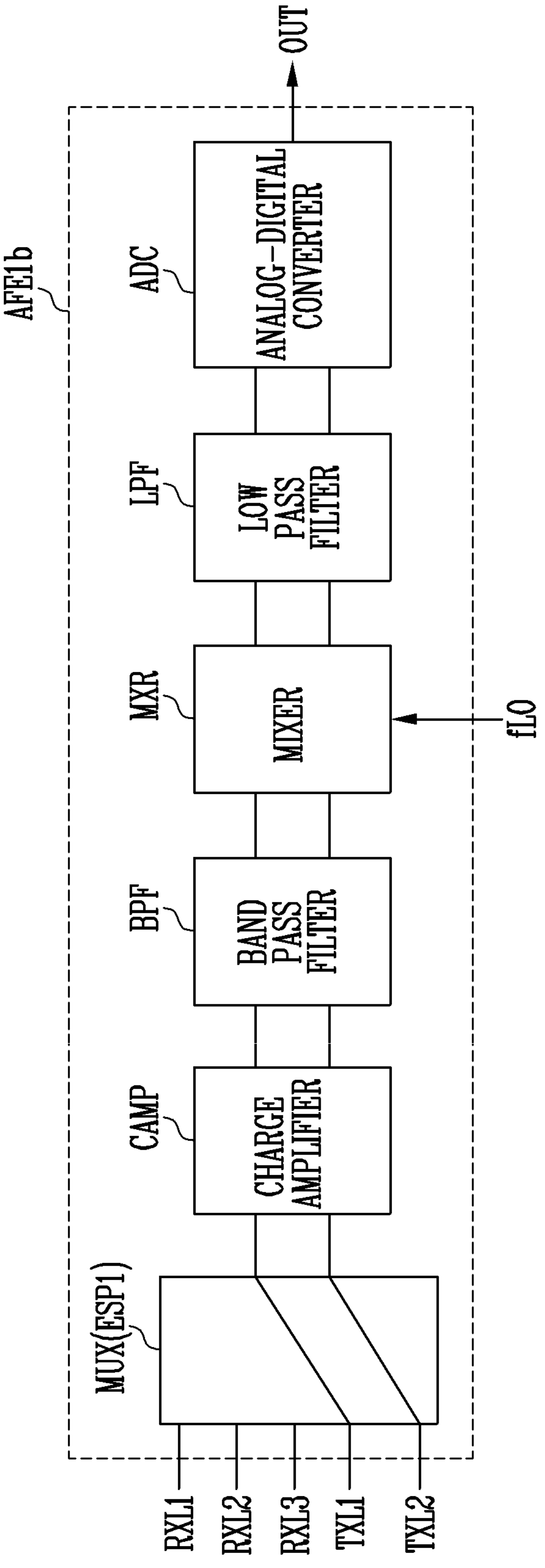
FIGS. 11 to 14 are diagrams illustrating an entire sensing period of the first frame period according to some embodiments of the present disclosure.

The first entire sensing period ESP1 may be a sensing period using all the first sensors TX1 to TX5. Referring to FIG. 11, during the first entire sensing period ESP1, the multiplexer MUX of the first analog front-end AFE1*b* may connect first sensor lines TXL1 and TXL2 to the charge amplifier CAMP. Meanwhile, during the first entire sensing period ESP1, the multiplexer MUX of the second analog front-end AFE2*b* may connect first sensor lines TXL2 and TXL3 to the charge amplifier CAMP. Similarly, all the first sensor lines TXL1 to TXL5 are connected to the analog front-end group AFEG, so that all the first sensors TX1 to TX5 can be in a state in which all the first sensors TX1 to TX5 can receive the downlink signal of the active pen APEN.

Figure 12:
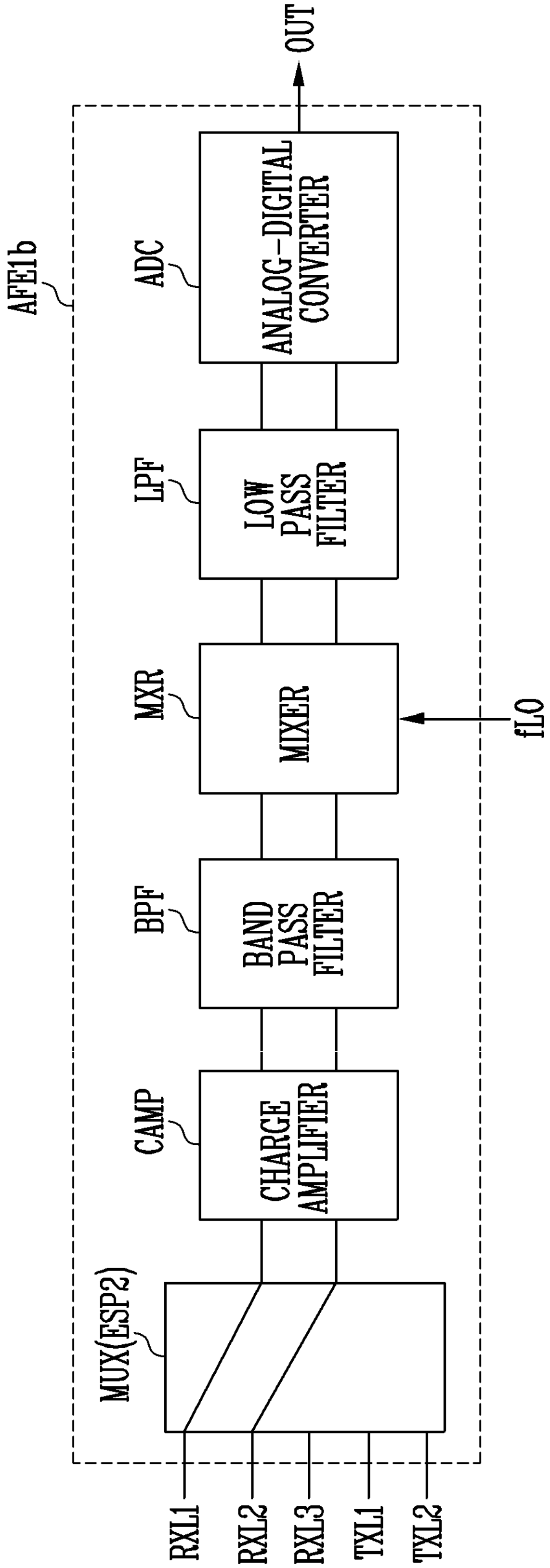

The second entire sensing period ESP2 may be a sensing period using a half of the second sensors RX1 to RX5. Referring to FIG. 12, during the second entire sensing period ESP2, the multiplexer MUX of the first analog front-end AFE1*b* may connect second sensor lines RXL1 and RXL2 to the charge amplifier CAMP. Meanwhile, during the second entire sensing period ESP2, the multiplexer MUX of the second analog front-end AFE2*b* may connect second sensor lines RXL3 and RXL4 to the charge amplifier CAMP. Accordingly, the half of the second sensors RX1 to RX5 can be in a state in which the half of the second sensors RX1 to RX5 can receive the downlink signal of the active pen APEN.

Figure 13:
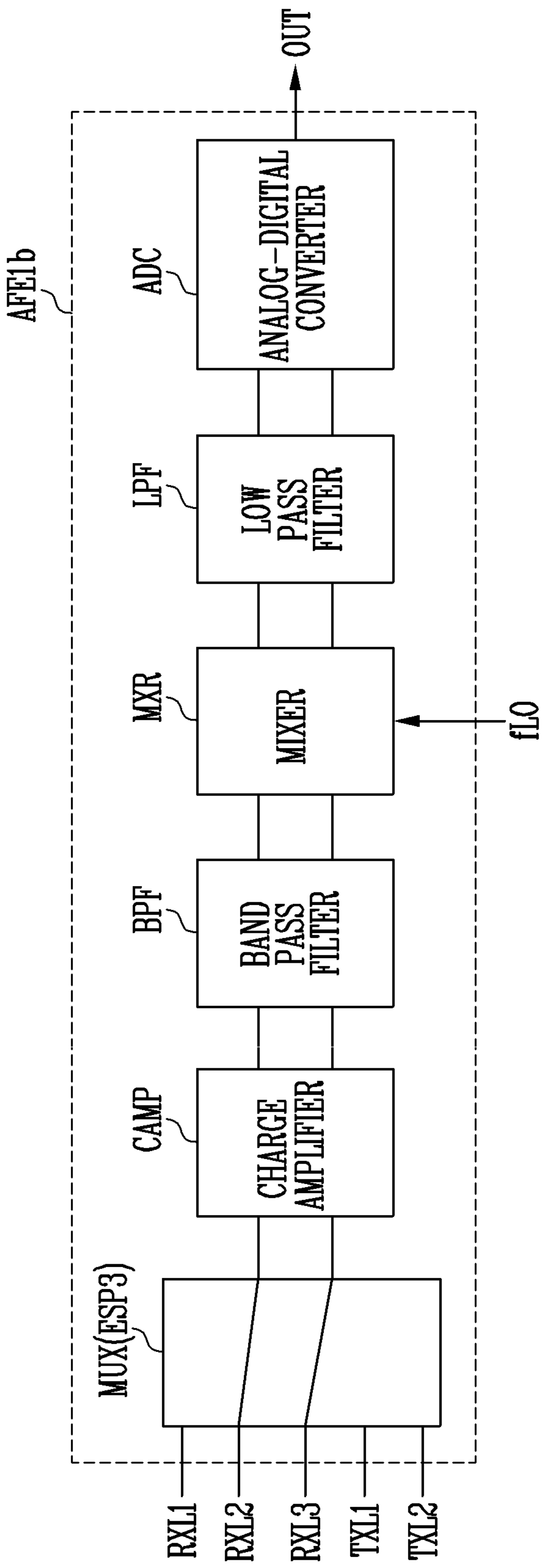

The third entire sensing period ESP3 may be a sensing period using the other half of the second sensors RX1 to RX5. Referring to FIG. 13, during the third entire sensing period ESP3, the multiplexer MUX of the first analog front-end AFE1*b* may connect second sensor lines RXL2 and RXL3 to the charge amplifier CAMP. Meanwhile, during the third entire sensing period ESP3, the multiplexer MUX of the second analog front-end AFE2*b* may connect second sensor line RXL4 and RXL5 to the charge amplifier CAMP. Accordingly, the other half of the second sensors RX1 to RX5 can be in a state in which the other half of the second sensors RX1 to RX5 can receive the downlink signal of the active pen APEN.

Figure 14:
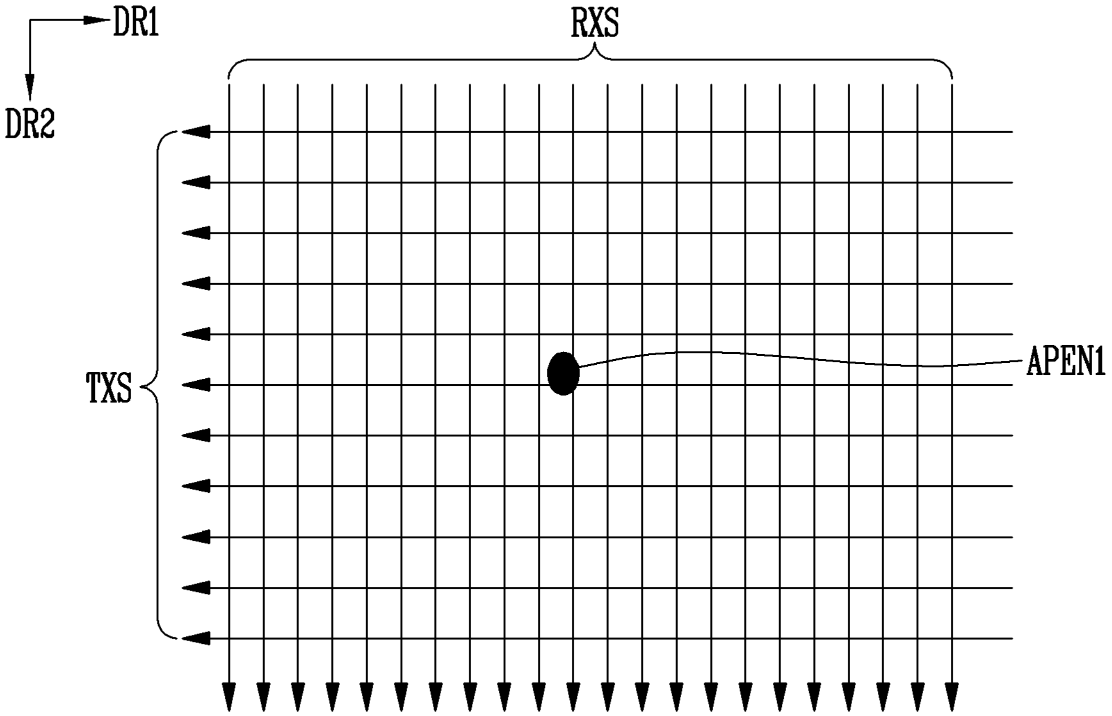
Figure 15:
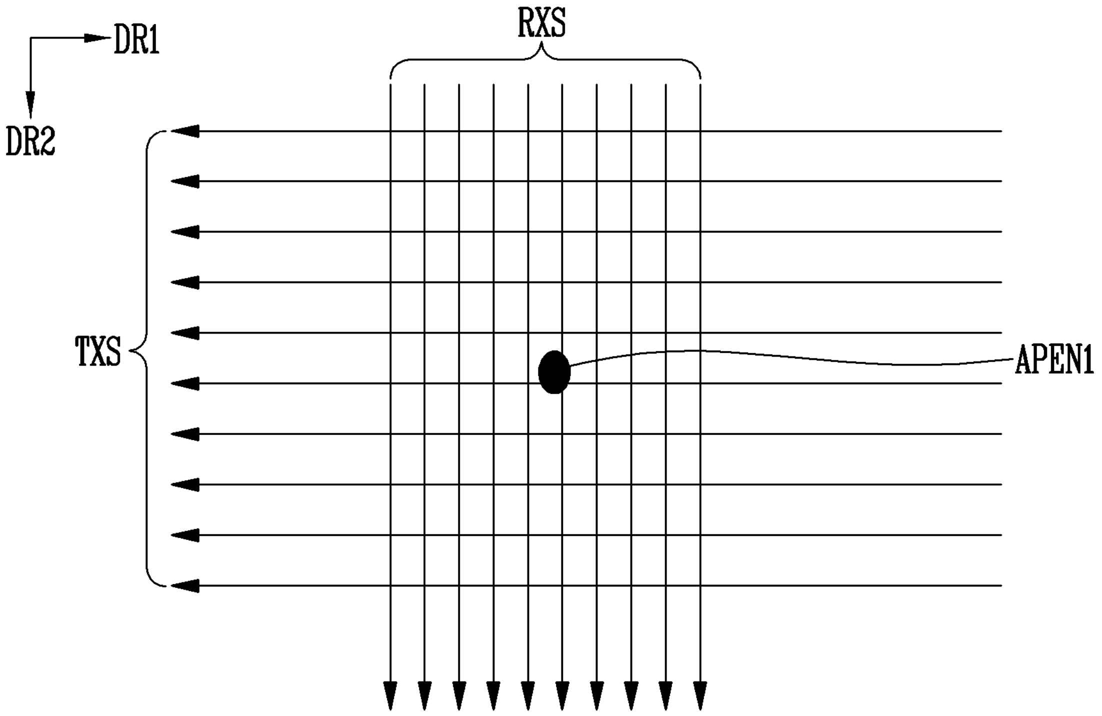
FIG. 15 is a diagram illustrating a partial sensing period of the first frame period according to some embodiments of the present disclosure.

Referring to FIG. 14, it is assumed that the active pen APEN is located at a first position APEN1. All the first sensors TX1 to TX5 may generate first sensing signals TXS, and all the second sensors RX1 to RX5 may generate second sensing signals RXS. Thus, although the active pen APEN is located at any position of the sensor unit 120, a coordinate position on a plane can be detected. The plane may be defined by the first direction DR1 and the second direction DR2.

According to some embodiments, the sensor driver 220 is driven by time-dividing the entire sensing period ESP into the first to third entire sensing periods ESP1, ESP2, and ESP3, so that the signal processor DSP can determine final sensing values of the entire sensor unit 120. In accordance with the embodiments shown in FIGS. 8 to 14, communication with the active pen APEN is possible while using analog front-ends AFE1*b* and AFE2*b* of which number is the same as shown in FIG. 6.

Meanwhile, during a partial sensing period PSP of the first active pen sensing period APSP1, the sensor device SSD may receive the downlink signal of the active pen APEN from some of the firsts sensors TX1 to TX5 and some of the second sensors RX1 to RX5, based on the position APEN1 of the active pen APEN, which is detected in the entire sensing period ESP.

The partial sensing period PSP may include a first partial sensing period PSP1 and a second partial sensing period PSP2. The first partial sensing period PSP1 is a sensing period of the active pen APEN, using some of the first sensors TX1 to TX5. The first partial sensing period PSP1 is the same as the description shown in FIG. 11, except that only the number of the first sensors TX1 to TX5 used is decreased, and therefore, overlapping descriptions will be omitted. The second partial sensing period PSP2 is a sensing period of the active pen APEN, using some of the second sensors RX1 to RX5. The second partial sensing period PSP2 is the same as the description shown in FIG. 12 or 13, except that only the number of the second sensors RX1 to RX5 used is decreased, and therefore, overlapping descriptions will be omitted.

Referring to FIG. 15, it is illustrated that some of the first sensors TX1 to TX5 located at the periphery of the pre-detected first position APEN1 of the active pen APEN generate first sensing signals TXS and some of the second sensors RX1 to RX5 located at the periphery of the pre-detected first position APEN1 of the active pen APEN generate second sensing signals RXS.

The signal processing period DSPP may be a period in which a position of the active pen APEN, a slope, and other data are generated based on digital signals OUT received by the signal processor DSP. However, the signal processing period DSPP is not necessarily to be started after the first active pen sensing period APSP1 is ended. For example, while digital signals OUT of the analog front-end group AFEG are generated, the signal processor DSP may generate a position of the active pen APEN, a slope, and other data. That is, sensing of the sensor unit 120 and signal processing of the signal processor DSP may be processed in parallel. Therefore, the first active pen sensing period APSP1 may continuously include the entire sensing period ESP and the partial sensing period PSP.

Figure 16:
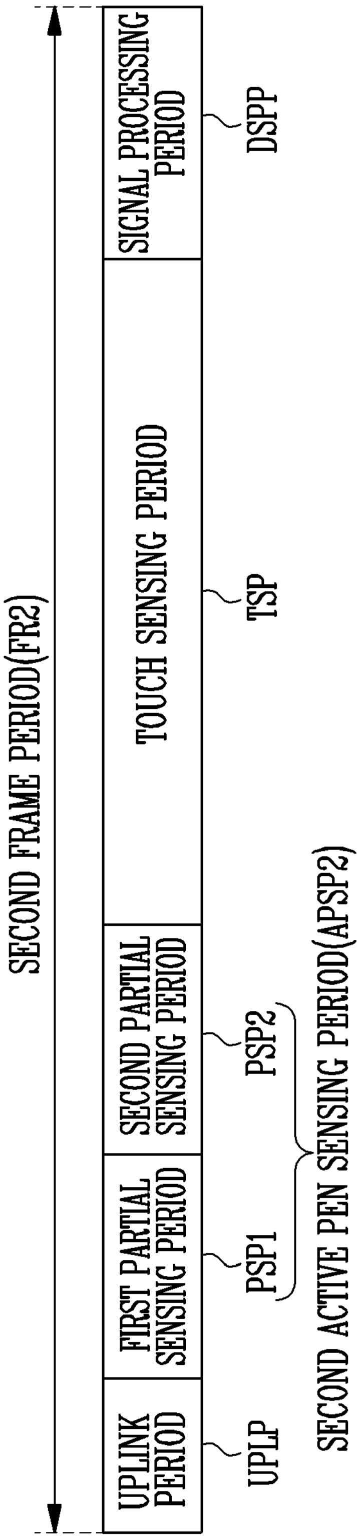
FIGS. 16 to 18 are diagrams illustrating a second frame period according to some embodiments of the present disclosure.
Figure 17:
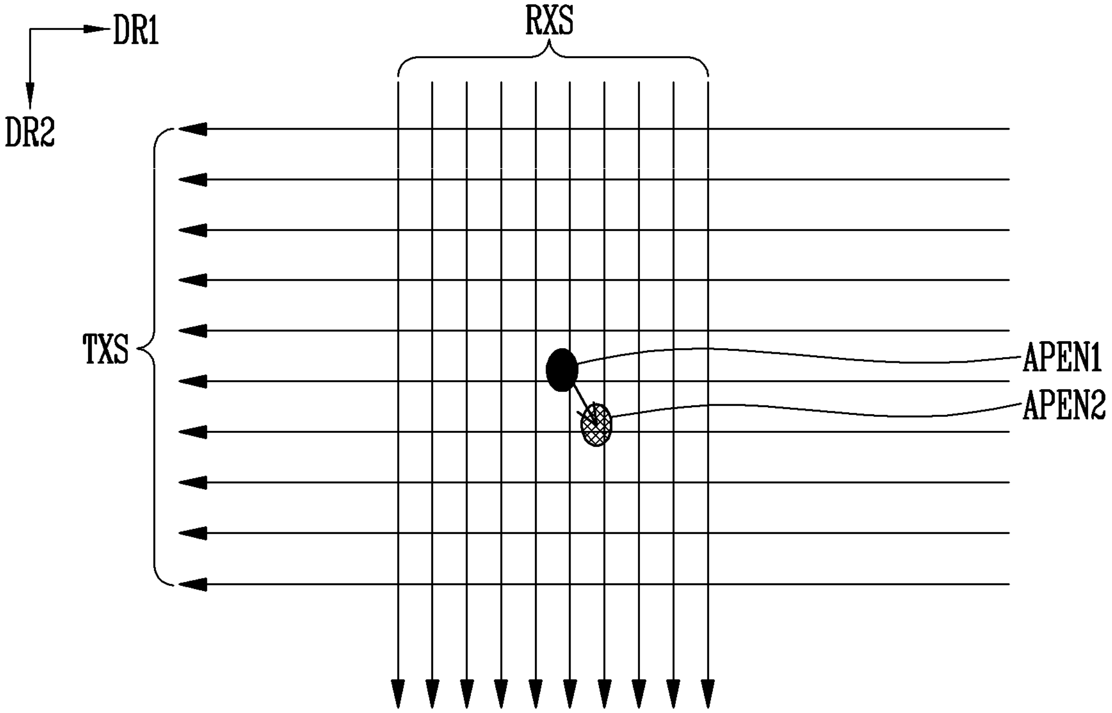
Figure 18:
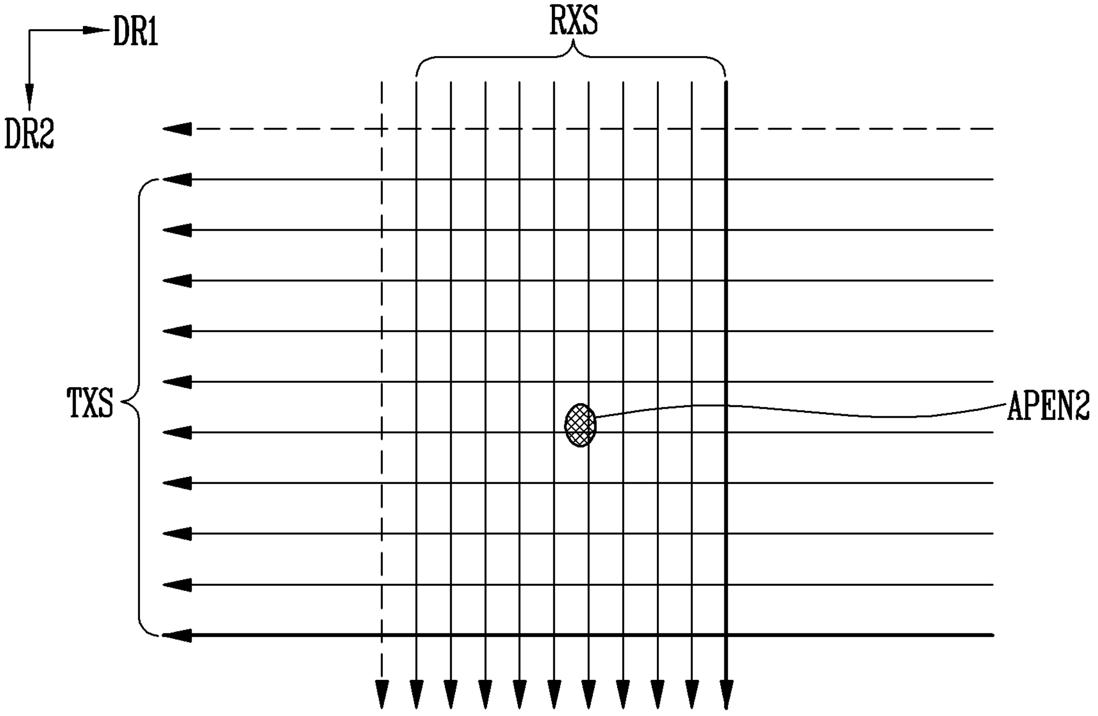

FIGS. 16 to 18 are diagrams illustrating a second frame period in according to some embodiments of the present disclosure.

Referring to FIG. 16, the second frame period FR2 next to the first frame period FR1 may include an uplink period UPLP, a second active pen sensing period APSP2, a touch sensing period TSP, and a signal processing period DSPP. When a position of the active pen APEN can be continuously identified after one first frame period FR1, a plurality of second frame periods FR2 may be successively performed. However, when the position of the active pen APEN is missed, the first frame period FR1 may be again performed. A description of the touch sensing period TSP will refer to the descriptions shown in FIGS. 6 and 7. Hereinafter, descriptions of portions overlapping with those described above will be omitted.

During the second active pen sensing period APSP2, a downlink signal of the active pen APEN may be received from some of the first sensors TX1 to TX5 and some of the second sensors RX1 to RX5. The second active pen sensing period APSP2 may include a first partial sensing period PSP1 and a second partial sensing period PSP2.

During the second active pen sensing period APSP2, a downlink signal of the active pen APEN may be received from some of the first sensors TX1 to TX5 and some of the second sensors RX1 to RX5, based on a position APEN1 of the active pen APEN, which is detected during a partial sensing period. The partial sensing period is a partial sensing period performed just before the second active pen sensing period APSP2, and may be the partial sensing period PSP of the first active pen sensing period APSP1. Also, the partial sensing period may refer to partial sensing periods PSP1 and PSP2 of a just previous second active pen sensing period APSP2 when a plurality of second active pen sensing periods APSP2 are successive.

Meanwhile, some of the first sensors TX1 to TX5 and some of the second sensors RX1 to RX5, which are sensed during the partial sensing period PSP or the second active pen sensing period APSP2 may vary based on a moving path of the active pen APEN. Referring to FIG. 17, it may be detected that the position of the active pen APEN has been changed from the first position APEN1 to a second position APEN2. Referring to FIG. 18, it can be seen that the first sensors TX1 to TX5 and the second sensors RX1 to RX5, which generate sensing signals TXS and RXS have been changed based on the new second position APEN2.

Figure 19:
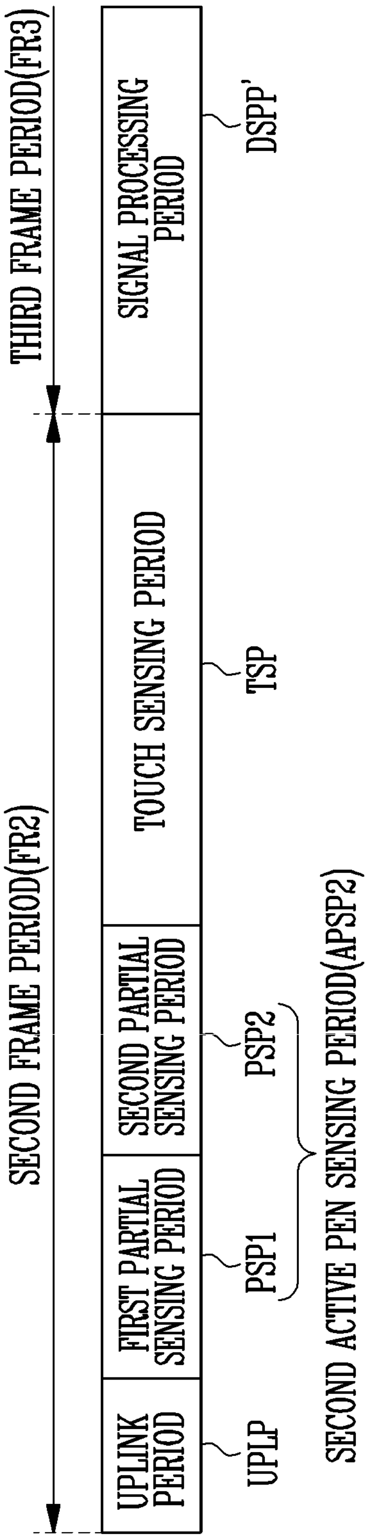
FIG. 19 is a diagram illustrating a second frame period according to some embodiments of the present disclosure.

FIG. 19 is a diagram illustrating a second frame period according to some embodiments of the present disclosure.

Referring to FIG. 19, it can be seen that a signal processing period DSPP' of the second frame period FR2 extends up to a third frame period FR3. As described above, sensing of the sensor unit 120 and signal processing of the signal processor DSP may be processed in parallel may be processed in parallel, and hence the signal processing period DSPP' may overlap with a portion of the second frame period FR2 and a portion of the third frame period FR3.

Figure 20:
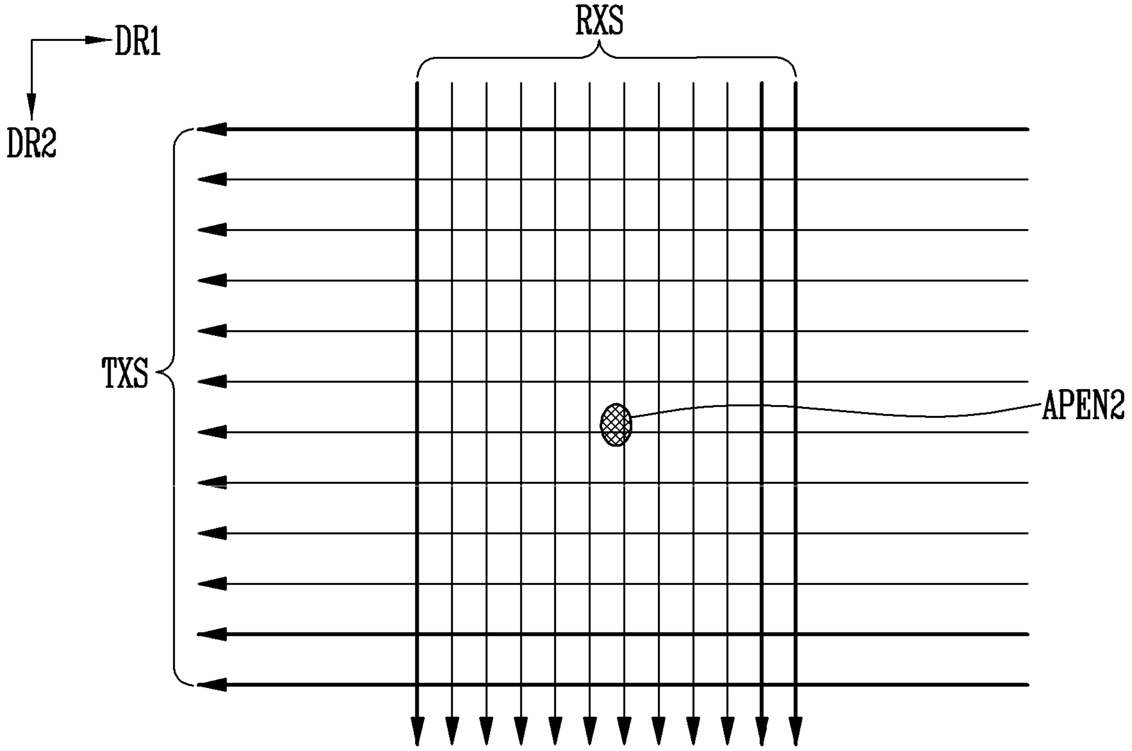
FIG. 20 is a diagram illustrating a partial sensing period according to some embodiments of the present disclosure.

FIG. 20 is a diagram illustrating a partial sensing period according to some embodiments of the present disclosure.

Referring to FIG. 20, when a speed of the active pen APEN increases, a number of some of the first sensors TX1 to TX5 and a number of some of the second sensors RX1 to RX5, which are sensed during the partial sensing period PSP or the second active pen sensing period APSP2, may increase.

Meanwhile, according to some embodiments, when the speed of the active pen APEN decreases, the number of some of the first sensors TX1 to TX5 and the number of some of the second sensors RX1 to RX5, which are sensed during the partial sensing period PSP or the second active pen sensing period APSP2, may decrease.

Figure 21:
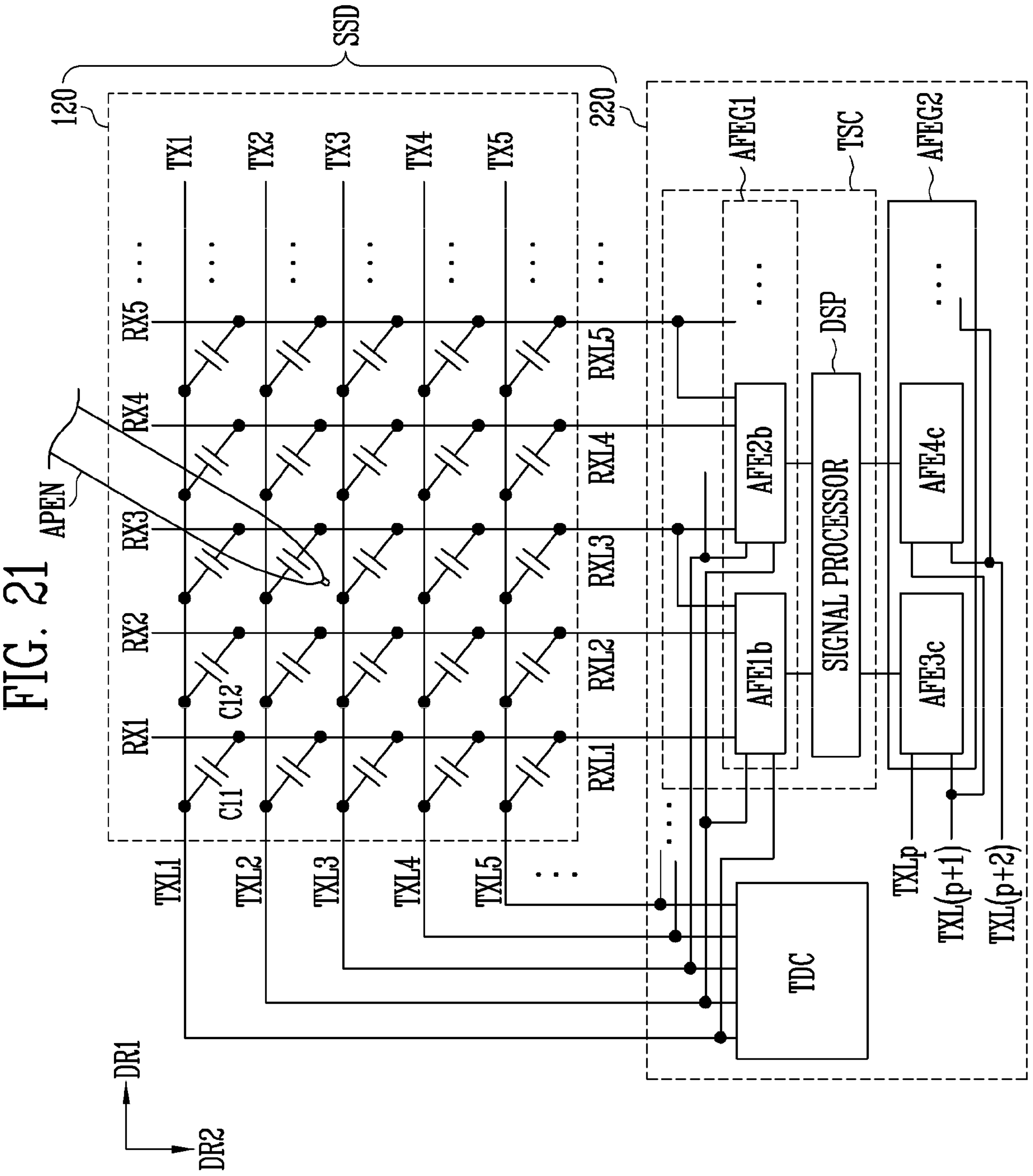
FIG. 21 is a diagram illustrating a sensor device according to some embodiments of the present disclosure.

FIG. 21 is a diagram illustrating a sensor device according to some embodiments of the present disclosure.

Referring to FIG. 21, the sensor device SSD may further include a second analog front-end group AFEG2 in addition to a first analog front-end group AFEG1 identical to the analog front-end group AFEG shown in FIG. 8.

The second analog front-end group AFEG2 may include a plurality of analog front-ends AFE3*c* and AFE4*c*. Each of a third analog front-end AFE3*c* and a fourth analog front-en AFE4$c$ is connected to at least one of first sensor lines TXLp, TXL(p+1), or TXL(p+2), and may not be connected to the second sensor lines RXL1 to RXL5.

For example, the third analog front-end AFE3$c$ may be connected to the first sensor lines TXLp and TXL(p+1). The fourth analog front-end AFE4$c$ may be connected to the first sensor lines TXL(p+1) and TXL(p+2). One TXL(p+1) of the first sensor lines TXLp and TXL(p+1) connected to the third analog front-en AFE3$c$ may be connected to the fourth analog front-end AFE4$c$.

The second analog front-end group AFEG2 does not operate during the touch sensing period TSP, but may operate during the active pen sensing period APSP1 and APSP2. For example, when some of the first sensor lines are not connected as the number of analog front ends included in the first analog front-end group AFEG1 is insufficient, the sensor device SSD may include the second analog front-end group AFEG2. A total number of required analog front-ends of the sensor device SSD may be determined by the following Equation 4

$$TTN = TXN - RXN/2 \quad \text{Equation 4}$$

TTN may be a total number of required analog front-ends, TXN may be a total number of the first sensors TX1 to TX5, and RXN may be a total number of the second sensors RX1 to RX5. When the number of analog front-ends AFE1$b$ and AFE2$b$ included in the first analog front-end group AFEG1 is smaller than TTN, the second analog front-end group AFEG2 including an insufficient number of analog front-ends may be provided in the sensor device SSD.

Figure 22:
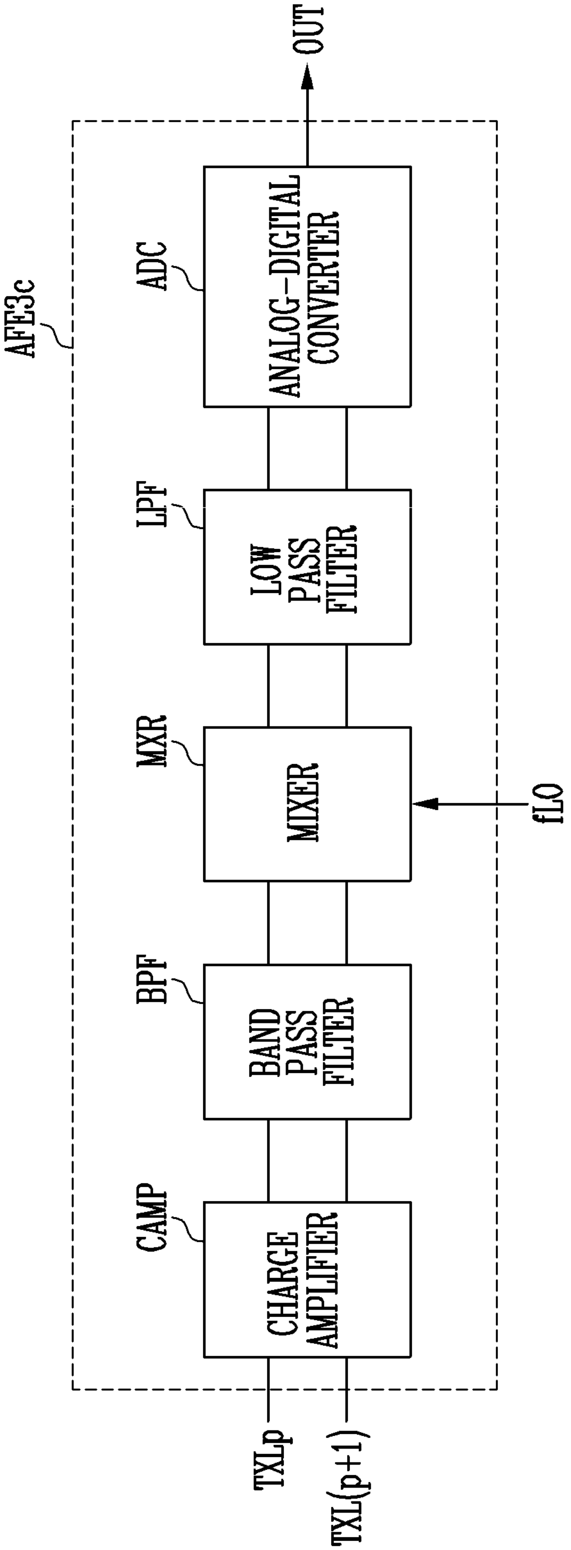
FIG. 22 is a diagram illustrating an example analog front-end of the embodiments shown in FIG. 21 according to some embodiments of the present disclosure.

FIG. 22 is a diagram illustrating an example analog front-end of the embodiments shown in FIG. 21.

Each of the analog front-ends AFE3$c$ and AFE4$c$ of the second analog front-end group AFEG2 may not include the multiplexer. For example, in FIG. 22, it is illustrated that the first sensor lines TXLp and TXL(p+1) connected to the third analog front-end AFE3$c$ do not pass through the multiplexer but are connected directly to the input terminals of the charge amplifier CAMP.

In a sensor device and driving method thereof in accordance with the present disclosure, touch sensing and active pen sensing can be performed using a minimum configuration.

Aspects of some embodiments of the present disclosure have been described herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, and their equivalents.

What is claimed is:

1. A sensor device comprising:

first sensors connected to first sensor lines;

second sensors connected to second sensor lines, the second sensors intersecting the first sensors;

a sensor transmitter connected to the first sensors through the first sensor lines, the sensor transmitter configured to supply touch driving signals to the first sensors during a touch sensing period; and a sensor receiver connected to the second sensors through the second sensor lines, the sensor receiver configured to receive touch sensing signals from the second sensors during the touch sensing period, wherein the sensor receiver includes a plurality of analog front-ends, and wherein each of the plurality of analog front-ends is connected to at least one of the second sensor lines and at least one of the first sensor lines, wherein each of the plurality of analog front-ends is connected to adjacent three of the second sensor lines and adjacent two of the first sensor lines, and wherein adjacent two of the plurality of analog front-ends share one of the adjacent three of the second sensor lines and one of the adjacent two of the first sensor lines.

2. The sensor device of claim 1, wherein the plurality of analog front-ends include a first analog front-end and a second analog front-end, and wherein one of the second sensor lines connected to the first analog front-end is connected to the second analog front-end.

3. The sensor device of claim 2, wherein one of the first sensor lines connected to the first analog front-end is connected to the second analog front-end.

4. The sensor device of claim 1, wherein each of the plurality of analog front-ends includes a multiplexer connected to three of the second sensor lines and two of the first sensor lines.

5. The sensor device of claim 4, wherein each of the plurality of analog front-ends further includes a charge amplifier connected to two lines selected in the multiplexer.

6. The sensor device of claim 4, wherein the charge amplifier is a fully differential amplifier.

7. The sensor device of claim 4, wherein each of the plurality of analog front-ends further includes:

a band pass filter configured to filter an output signal of the charge amplifier to have a set frequency band;

a mixer configured to mix an output signal of the band pass filter and a local clock signal;

a low pass filter configured to filter an output signal of the mixer to have a set frequency band; and an analog-digital converter configured to convert an output signal of the low pass filter into a digital signal.

8. The sensor device of claim 1, wherein a first frame period includes an uplink period, a first active pen sensing period, and a signal processing period, and wherein a second frame period next to the first frame period includes the uplink period, a second active pen sensing period, the touch sensing period, and the signal processing period.

9. The sensor device of claim 8, wherein, during an entire sensing period of the first active pen sensing period, the sensor device receives a downlink signal of an active pen from all the first sensors and all the second sensors, and wherein, during the second active pen sensing period, the sensor device receives the downlink signal of the active pen from some of the first sensors and some of the second sensors.

10. The sensor device of claim 9, wherein, during a partial sensing period of the first active pen sensing period, the sensor device is configured to receive the downlink signal of the active pen from some of the first sensors and some of the second sensors, based on a position of the active pen, which is detected in the entire sensing period.

11. The sensor device of claim 10, wherein, during the second active pen sensing period, the sensor device is configured to receive the downlink signal of the active pen from some of the first sensors and some of the second sensors, based on a position of the active pen, which is detected during the partial sensing period.

12. The sensor device of claim 11, wherein some of the first sensors and some of the second sensors, which are configured to sense during the partial sensing period or the second active pen sensing period, vary based on a moving path of the active pen.

13. The sensor device of claim 11, wherein, based on a speed of the active pen increasing, a number of some of the first sensors and a number of some of the second sensors, which are configured to sense during the partial sensing period or the second active pen sensing period, increase.

14. The sensor device of claim 13, wherein, based on the speed of the active pen decreasing, the number of some of the first sensors and the number of some of the second sensors, which are configured to sense during the partial sensing period or the second active pen sensing period, decrease.

* * * * *